United States Patent
Gan et al.

(10) Patent No.: US 11,792,060 B2
(45) Date of Patent: *Oct. 17, 2023

(54) INFORMATION TRANSMISSION METHOD AND APPARATUS

(71) Applicant: HUAWEI TECHNOLOGIES CO., LTD., Shenzhen (CN)

(72) Inventors: Ming Gan, Shenzhen (CN); Xin Zuo, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

This patent is subject to a terminal disclaimer.

(21) Appl. No.: 17/990,416

(22) Filed: Nov. 18, 2022

(65) Prior Publication Data

US 2023/0155875 A1 May 18, 2023

Related U.S. Application Data

(63) Continuation of application No. 17/036,996, filed on Sep. 29, 2020, now Pat. No. 11,528,174, which is a continuation of application No. PCT/CN2019/075498, filed on Feb. 19, 2019.

(30) Foreign Application Priority Data

Mar. 31, 2018 (CN) .......................... 201810278595.5

(51) Int. Cl.
*H04L 27/26* (2006.01)

(52) U.S. Cl.
CPC .......... *H04L 27/2614* (2013.01); *H04L 27/261* (2013.01); *H04L 27/2613* (2013.01); *H04L 27/2603* (2021.01)

(58) Field of Classification Search
CPC .................... H04L 27/2614; H04L 27/2613
See application file for complete search history.

(56) References Cited

U.S. PATENT DOCUMENTS

| 9,832,058 | B2 | 11/2017 | Lee et al. | |
|---|---|---|---|---|
| 2016/0165589 | A1* | 6/2016 | Chu et al. .............. | H04W 4/06 370/329 |

(Continued)

FOREIGN PATENT DOCUMENTS

| CN | 101374125 A | 2/2009 |
|---|---|---|
| CN | 104247316 A | 12/2014 |

(Continued)

OTHER PUBLICATIONS

IEEE P802.11ax/D1.3, "Draft Standard for Information technology-Telecommunications and information exchange between systems Local and metropolitan area networks-Specific requirements; Part 11: Wireless LAN Medium Access Control (MAC) and Physical Layer (PHY) Specifications Amendment 6: Enhancements for High Efficiency WLAN," Jun. 2017, 522 pages.

(Continued)

*Primary Examiner* — Samina F Choudhry
(74) *Attorney, Agent, or Firm* — Fish & Richardson P.C.

(57) ABSTRACT

Embodiments of this application provide information transmission methods and apparatuses. One method includes: generating, by a first communications device, a physical layer protocol data unit (PPDU) with a bandwidth of X MHz, wherein X>160, some or all fields in the PPDU are rotated in the bandwidth of X MHz by using a rotation factor sequence, the bandwidth of X MHz comprises n bandwidths of Y MHz, the rotation factor sequence comprises n rotation factors, and each of the n bandwidths corresponds to one rotation factor; and sending, by the first communications device, the PPDU to a second communications device.

12 Claims, 6 Drawing Sheets

(56) References Cited

U.S. PATENT DOCUMENTS

2017/0126456 A1* 5/2017 Lee et al. ........ H04L 25/03866

FOREIGN PATENT DOCUMENTS

| CN | 105052102 | A | 11/2015 |
|---|---|---|---|
| CN | 107040487 | A | 8/2017 |
| JP | 2015518322 | A | 6/2015 |
| JP | 2016504839 | A | 2/2016 |
| WO | 2010006012 | A1 | 1/2010 |
| WO | 2013152111 | A1 | 10/2013 |

OTHER PUBLICATIONS

IEEE Std 802.11-2016 (Revision of IEEE Std 802.11-2012), Part 11: Wireless LAN Medium Access Control (MAC) and Physical Layer (PHY) Specifications, IEEE Computer Society, Sponsored by the LAN/MAN Standards Committee, 3534 pages.

IEEE Std 802.11ac-2013, Amendment 4: Enhancements for Very High Throughput for Operation in Bands below 6 GHz., 425 pages.

PCT International Search Report and Written Opinion in International Application No. PCT/CN2019/075498, dated Apr. 29, 2019, 13 pages (With English Translation).

Cheong et al., "Proposed Text for Gamma Phase Rotation for HE PPDU," IEEE P802.11Wireless LANs, Jul. 2016, 8 pages.

Extended European Search Report in European Application No. 19776331.1, dated Apr. 23, 2021, 9 pages.

McCann et al., "Minutes of the IEEE P802.11 Full Working Group," IEEE P802/11 Wireless LANs, Doc IEEE 802.11-16/0984r0, Jul. 2016, 35 pages.

Noh et al., "Gamma Phase Rotation for HE PPDU," IEEE 802.11-16/0903r1, Jul. 2016, 26 pages.

Office Action issued in Japanese Application No. 2020-552874 on Mar. 8, 2022, 4 pages (with English translation).

Office Action issued in Japanese Application No. 2020-552874 on Nov. 30, 2021, 6 pages (with English translation).

Office Action in Chinese Appln. No. 201810278595.5, dated Apr. 11, 2023, 5 pages.

* cited by examiner

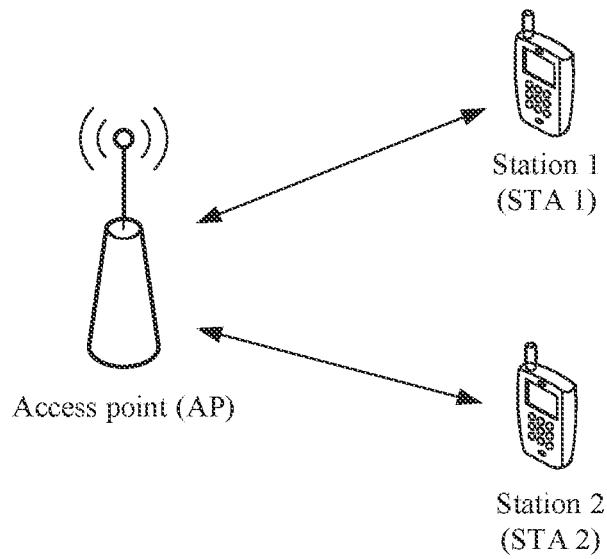

FIG. 1

| Legacy short training field (L-STF) | Legacy long training field (L-LTF) | Legacy signal field (L-SIG) | High throughput field (HT-SIG) | High throughput short training field (HT-STF) | High throughput long training field (HT-LTF) | Data field (data) |

FIG. 2

| Legacy short training field (L-STF) | Legacy long training field (L-LTF) | Legacy signal field (L-SIG) | Very high throughput field A (VHT-SIG-A) | Very high throughput short training field (VHT-STF) | Very high throughput long training field (VHT-LTF) | Very high throughput field B (VHT-SIG-B) | Data field (data) |

FIG. 3

INFORMATION TRANSMISSION METHOD AND APPARATUS

CROSS-REFERENCE TO RELATED APPLICATIONS

This application is a continuation of U.S. Pat. Application No. 17/036,996, filed on Sep. 29, 2020, which is a continuation of International Application No. PCT/CN2019/075498, filed on Feb. 19, 2019, which claims priority to Chinese Patent Application No. 201810278595.5, filed on Mar. 31, 2018. All of the aforementioned patent applications are hereby incorporated by reference in their entireties.

TECHNICAL FIELD

This application relates to the field of communications technologies, and in particular, to an information transmission method and apparatus.

BACKGROUND

An orthogonal frequency division multiplexing (OFDM) technology is a multi-carrier modulation technology. The OFDM technology has advantages of high spectral efficiency and anti-multipath fading, and the like, but it also has a disadvantage of a high peak to average power ratio (PAPR). Because superposition of a plurality of sub-carriers in OFDM leads to a relatively large peak signal, a high power amplifier needs to have a relatively large linear dynamic range. This increases costs of the high power amplifier and also reduces efficiency of the high power amplifier. If the peak value exceeds the linear dynamic range of the high power amplifier, in-band distortion and out-of-band dispersion are caused. Therefore, PAPR reduction is a key technology to an OFDM system and has great significance.

With the rapid development of wireless communications technologies, a 6-GHz band newly introduced in the wireless communications protocol 802.11ax may support a bandwidth greater than 160 MHz. A PAPR problem faced when a higher bandwidth is used is more serious. How to reduce a PAPR caused when a higher bandwidth is used is a problem that urgently needs to be resolved.

SUMMARY

Embodiments of this application provide an information transmission method and apparatus to reduce a PAPR of information transmitted on a high bandwidth.

To achieve the foregoing objective, the following technical solutions are used in the embodiments of this application:

According to a first aspect, an information transmission method is provided, where the method includes: generating a physical layer protocol data unit PPDU with a bandwidth of X MHz, where X>160, some or all fields in the PPDU are rotated in the bandwidth of X MHz by using a rotation factor sequence, the bandwidth of X MHz includes n bandwidths of Y MHz, the rotation factor sequence includes n rotation factors, and each bandwidth of Y MHz is corresponding to one rotation factor; and sending the PPDU with the bandwidth of X MHz. That some or all fields in the PPDU are rotated in the bandwidth of X MHz by using a rotation factor sequence may also be: Each of the some or all fields in the PPDU is rotated in the n bandwidths of Y MHz by using the rotation factor sequence. In the foregoing technical solution, the PPDU with a bandwidth greater than 160 MHz may be generated, and the some or all fields in the PPDU are rotated in the bandwidth of X MHz by using the rotation factor sequence. In this way, PAPRs of the some or all fields in the PPDU when a high bandwidth is used can be reduced by using the rotation factor sequence.

In a possible implementation of the first aspect, before generating a PPDU with a bandwidth of X MHz, the method further includes: selecting the bandwidth of X MHz for transmitting the PPDU, where X MHz is any one of the following: 200 MHz, 240 MHz, 280 MHz, and 320 MHz. In the foregoing possible implementation, several bandwidths greater than 160 MHz are provided to improve diversity of high bandwidths, and further increase an information transmission rate when information is transmitted by using a high bandwidth.

In a possible implementation of the first aspect, a legacy short training field L-STF, a legacy long training field L-LTF, and a legacy signal field L-SIG that are included in the PPDU are duplicated in n bandwidths of Y MHz, and the L-STF, the L-LTF, and the L-SIG are rotated by using the rotation factor sequence. In the foregoing possible implementation, PAPRs of legacy preambles in the PPDU during duplicate transmission can be reduced by rotating the L-STF, the L-LTF, and the L-SIG in the PPDU.

In a possible implementation of the first aspect, a field in at least one of the n bandwidths of Y MHz is rotated. In the foregoing possible implementation, a PAPR of the PPDU or a part of the PPDU can be reduced by rotating the field in the at least one bandwidth of Y MHz.

In a possible implementation of the first aspect, Y=20, and the first four rotation factors in the rotation factor sequence are [1 -1 -1 -1]. In the foregoing possible implementation, a rotation factor corresponding to a high bandwidth may include a rotation factor corresponding to a bandwidth of 80 MHz to improve information transmission compatibility.

In a possible implementation of the first aspect. X=200, and the rotation factor sequence is [1 -1 -1 -1 -1 -j j -j 1 1]. In the foregoing possible implementation, when the PPDU is transmitted by using the bandwidth of 200 MHz, a PAPR of the PPDU when the bandwidth of 200 MHz is used can be minimized by using the foregoing rotation factor.

In a possible implementation of the first aspect, X=240, and the rotation factor sequence is any one of the following sequences: [1 -1 -1 -1 1 1 1 1 -1 1 1 -1], [1 -1 -1 -1 1 -1 1 1 -1 1 1 1], [1 -1 -1 -1 j -1 1 -1 -1 1 1 -j 1], [1 -1 -1 -1 -1 1 1 1 -1 1 1 -1], [1 -1 -1 -1 -1 1 1 -1 1 -1 1 1 1], [1 -1 -1 -1 -1 -1 1 1 1 -1 1 1 -1 1], and [1 -1 -1 -1 -j -1 1 -1 -1 1 j 1]. In the foregoing possible implementation, when the PPDU is transmitted by using the bandwidth of 240 MHz, a PAPR of the PPDU when the bandwidth of 240 MHz is used can be minimized by using the foregoing rotation factor.

In a possible implementation of the first aspect, X=280, and the rotation factor sequence is any one of the following sequences: [1 -1 -1 -1 j 1 -1 j -j -j -j 1 j -j], [1 -1 -1 -1 j 1 -j j -j -j -j 1 j -1], [1 -1 -1 -1 j -j j -j -j -j 1 -1 j), [1 -1 -1 -1 j -j j j -j -j -j 1-1 1], [1 -1-1 -1 -j 1 j -j j j j 1 -j -1], [1 -1 -1-1 -j 1-1 -j j j j 1 -j j], [1 -1 -1 -1 -j j 1 -j j j j 1 -1 -j], and [1 -1 -1 -1 -j j -j j j j 1 -1 1]. In the foregoing possible implementation, when the PPDU is transmitted by using the bandwidth of 280 MHz, a PAPR of the PPDU when the bandwidth of 280 MHz is used can be minimized by using the foregoing rotation factor.

In a possible implementation of the first aspect, X=320, and the rotation factor sequence is any one of the following sequences: [1 -1 -1 -1 1 1 j -j 1 -1 1 1 1 1 -j j], [1 -1 -1 -1 1 1 -j j 1 -1 1 1 1 1 j -j], [1 -1 -1 -1 1 j 1 1 -1 1 1 1 -j 1 j], [1 -1 -1 -1

1 j -j 1 1 1 1 -1 1 -j j 1], [1 -1 -1 -1 1 -j 1 j 1 1 -1 1 1 j 1 -j], [1 -1 -1 -1 1 -j j 1 1 1 1 -1 1 j -j 1], [1 -1 -1 -1 j 1 j -1 -1 1 1 -1 -j 1 -j -1], [1 -1 -1 -1 j 1 -1 j -1 -1 -1 1 -j 1 -1 -j], [1 -1 -1 -1 j j 1 -1 -1 1 -1 -1 -j 1 -1], [1 -1 -1 -1 j j -1 1 -1 1 -1 -1 -j -j 1 1], [1 -1 -1 -1 j -1 1 j -1 -1 -1 1 -j -1 1 -j], [1 -1 -1 -1 j -1 j 1 -1 -1 1 -1 -j -1 -j 1], [1 -1 -1 -1 -1 j -1 -j 1 1 -1 1 -1 -1 -j -1 j], [1 -1 -1 -1 -1 j -j -1 1 1 1 -1 -1 -j j -1], [1 -1 -1 -1 -1 -1 j -j 1 -1 1 1 1 -1 -1 -j j], [1 -1 -1 -1 -1 -1 -j j 1 -1 1 1 -1 -1 -1 j -j], [1 -1 -1 -1 -1 -1 -j -j 1 1 1 1 -1 -1 1 j -j -1], [1 -1 -1 -1 -1 -1 -j -1 j 1 1 -1 1 1 -1 j -1 -j], [1 -1 -1 -1 -1 j 1 -1 -j -1 -1 -1 1 1 j 1 j -1], [1 -1 -1 -1 -1 -j -1 1 -j -1 -1 -1 1 1 j -1 1 j], [1 -1 -1 -1 -1 -j -1 -j 1 -1 -1 -1 1 1 j j 1 -1], and [1 -1 -1 -1 -j -j -1 1 -1 1 -1 -1 -1 j j -1 1]. In the foregoing possible implementation, when the PPDU is transmitted by using the bandwidth of 320 MHz, a PAPR of the PPDU when the bandwidth of 320 MHz is used can be minimized by using the foregoing rotation factor.

In a possible implementation of the first aspect, X=200, Y=20, n=10, and the rotation factor sequence is any one of rotation factor sequences shown in Table 1-3 in the specification. In the foregoing possible implementation, when a rotation factor corresponding to the bandwidth of 80 MHz is not used, a PAPR of the PPDU when a bandwidth of 200 MHz is used can be minimized by using a rotation factor shown in Table 1-3 in the specification.

In a possible implementation of the first aspect, X=240, Y=20. n=12, and the rotation factor sequence is any one of rotation factor sequences shown in Table 2-3 in the specification. In the foregoing possible implementation, when a rotation factor corresponding to the bandwidth of 80 MHz is not used, a PAPR of the PPDU when a bandwidth of 240 MHz is used can be minimized by using a rotation factor shown in Table 2-3 in the specification.

According to a second aspect, an information transmission apparatus is provided, where the apparatus includes: a generation unit, configured to generate a physical layer protocol data unit PPDU with a bandwidth of X MHz, where X>160, some or all fields in the PPDU are rotated in the bandwidth of X MHz by using a rotation factor sequence, the bandwidth of X MHz includes n bandwidths of Y MHz, the rotation factor sequence includes n rotation factors, and each bandwidth of Y MHz is corresponding to one rotation factor; and a sending unit, configured to send the PPDU with the bandwidth of X MHz.

In a possible implementation of the second aspect, the apparatus further includes a selection unit, configured to select the bandwidth of X MHz for transmitting the PPDU, where X MHz is any one of the following: 200 MHz, 240 MHz. 280 MHz, and 320 MHz.

In a possible implementation of the second aspect, a legacy short training field L-STF, a legacy long training field L-LTF. and a legacy signal field L-SIG that are included in the PPDU are duplicated in n bandwidths of Y MHz, and the L-STF, the L-LTF, and the L-SIG are rotated by using the rotation factor sequence.

In a possible implementation of the second aspect, a field in at least one of the n bandwidths of Y MHz is rotated.

In a possible implementation of the first aspect. Y=20, and the first four rotation factors in the rotation factor sequence are [1 -1 -1 -1].

In a possible implementation of the second aspect, X=200, and the rotation factor sequence is [1 -1 -1 -1 -1 -j j -j -1 1].

In a possible implementation of the second aspect. X=240, and the rotation factor sequence is any one of the following sequences: [1 -1 -1 -1 1 1 1 1 -1 1 1 -1], [1 -1 -1 -1 1 -1 1 1 -1 1 1 1], [1 -1 -1 -1 j -1 1 -1 1 -1 -j 1], [1 -1 -1 -1 1 1 -1 1 -1 1], [1 -1 -1 -1 1 -1 -1 -1 1 1 -1 1 1 1], and [1 -1 -1 -1 -j -1 1 -1 1 j 1].

In a possible implementation of the second aspect, X=280, and the rotation factor sequence is any one of the following sequences: [1 -1 -1 -1 j 1 -1 j -j -j -j 1 j -j], [1 -1 -1 -1 j 1 -j j -j -j -j 1 j -1], [1 -1 -1 -1 j 1 j -j -j -j -j 1 -1 j], [1 -1 -1 -1 j -j j j -j -j -j 1 -1 1], [1 -1 -1 -1 j -j j j -j -j 1 -1 1], [1 -1 -1 -1 -j 1 -j j j j 1 -j -1], [1 -1 -1 -1 -j 1 -j j j j 1 -j -1], [1 -1 -1 -1 -j 1 -j j j j 1 -j -j], and [1 -1 -1 -1 -1 -j j -j j j j 1 -1 1].

In a possible implementation of the second aspect, X=320, and the rotation factor sequence is any one of the following sequences: [1 -1 -1 -1 1 1 1 j -j 1 -1 1 1 1 1 -j j], [1 -1 -1 -1 1 1 1 -j j 1 -1 1 1 1 1 1 j -j], [1 -1 -1 -1 1 j 1 -j 1 1 -1 1 1 -1 1 1 -j 1 j], [1 -1 -1 -1 1 j -j 1 1 1 1 -1 1 j j 1], [1 -1 -1 -1 1 -j j 1 1 -1 1 -j j 1], [1 -1 -1 -1 1 -j j 1 1 -1 1 1 j 1 -j], [1 -1 -1 -1 j 1 j -1 -1 1 -1 j -1 -j -1], [1 -1 -1 -1 j 1 -1 j -1 -1 1 1 -j -1 -1 -j], [1 -1 -1 -1 j j 1 -1 1 -1 -1 -1 -j -j 1 -1], [1 -1 -1 -1 -j -j 1 1 -1 -1 1 j -j -1], [1 -1 -1 -1 -1 -j j 1 1 1 -1 -1 j j -j -1], [1 -1 -1 -1 -1 -j j -1 -1 -1 -1 j 1 1 -1 1 -j], [1 -1 -1 -1 -j 1 -j -1 -1 1 1 j 1 -1 j], [1 -1 -1 -1 -j 1 -1 j -1 -1 -1 1 1 j -1 1 1 j], [1 -1 -1 -1 -j -1 -j 1 -1 1 -1 1 1 j -1 1 1 j], [1 -1 -1 -1 -j -1 -j 1 -1 1 -1 1 -1 j -1 j 1], and [1 -1 -1 -1 -j -j -1 1 -1 1 -1 -1 -1 j j 1 -1].

In a possible implementation of the second aspect, X=200, Y=20, n=10, and the rotation factor sequence is any one of rotation factor sequences shown in Table 1-3 in the specification.

In a possible implementation of the second aspect, X=240, Y=20, n=12, and the rotation factor sequence is any one of rotation factor sequences shown in Table 2-3 in the specification.

According to a third aspect, an information transmission apparatus is provided. The information transmission apparatus includes a processor, a memory, a communications interface, and a bus, and the processor, the memory, and the communications interface are connected by using the bus. The memory is configured to store program code, and the communications interface is configured to support the information transmission apparatus in performing communication. When the program code is executed by the processor, the information transmission apparatus is enabled to perform the steps in the information transmission method provided in any one of the first aspect and the possible implementations of the first aspect.

According to a fourth aspect, a computer-readable storage medium is provided. The computer-readable storage medium stores an instruction. When the instruction is run on a computer, the computer is enabled to perform the information transmission method provided in any one of the first aspect or the possible implementations of the first aspect.

According to a fifth aspect, a computer program product including an instruction is provided. When the computer program product is run on a computer, the computer is enabled to perform the information transmission method provided in any one of the first aspect or the possible implementations of the first aspect.

It can be understood that any one of the information transmission apparatus, the computer storage medium, or the computer program product provided above is configured to perform the corresponding method provided above. Therefore, for beneficial effects that can be achieved by the apparatus, computer storage medium, or computer program product, refer to the beneficial effects in the corresponding method provided above. Details are not described herein again.

BRIEF DESCRIPTION OF DRAWINGS

FIG. 1 is a schematic structural diagram of a communications system according to an embodiment of this application:

FIG. 2 is a schematic diagram of a frame structure of a PPDU according to an embodiment of this application:

FIG. 3 is a schematic diagram of a frame structure of another PPDU according to an embodiment of this application:

DESCRIPTION OF EMBODIMENTS

Figure 4:
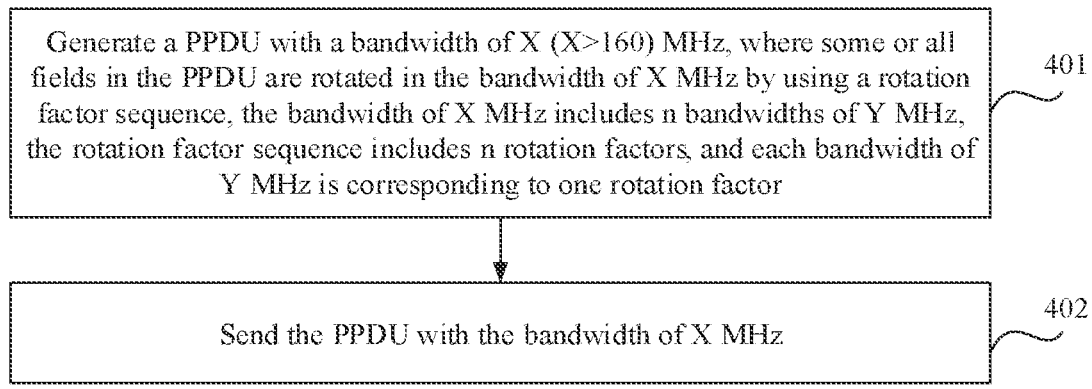
FIG. 4 is a schematic flowchart of an information transmission method according to an embodiment of this application.

The following describes the technical solutions in the embodiments of this application with reference to the accompanying drawings in the embodiments of this application.

It should be understood that, the embodiments of this application may be applied to various communications systems, such as a global system for mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access WiMAX) communications system, and a future 5G communications system.

It should also be understood that the embodiments of this application may further be applied to various communications systems based on a non-orthogonal multiple access technology, for example, a sparse code multiple access SCMA) system. Certainly, SCMA may also have another name in the communications field. Further, the technical solutions in the embodiments of this application may be applied to multi-carrier transmission systems using non-orthogonal multiple access technologies, for example, systems using non-orthogonal multiple access technologies: orthogonal frequency division multiplexing (OFDM), filter bank multi-carrier (FBMC), generalized frequency division multiplexing (GFDM), and filtered orthogonal frequency division multiplexing (filtered-OFDM. F-OFDM).

It should also be understood that the embodiments of this application may be applied to an LTE system and a subsequent evolved system such as a 5G system, or other wireless communications systems using various radio access technologies, for example, systems using access technologies such as code division multiple access. frequency division multiple access, time division multiple access, orthogonal frequency division multiple access, and single carrier frequency division multiple access, and are particularly applicable to a scenario in which channel information feedback is required and/or a two-level precoding technology is applied, for example, in a wireless network using a massive MIMO technology or a wireless network using a distributed antenna technology.

It should also be understood that the embodiments of this application may be applied to Wi-Fi wireless communication. A Wi-Fi wireless communications system includes an access point (AP) and a station (STA). The station may also be referred to as a site. Related wireless communication scenarios may include communication between an AP and a STA, communication between APs, communication between STAs, and the like. In the embodiments of this application, communication between an AP and a STA is used as an example for description. As shown in FIG. 1, an AP performs wireless communication with a STA 1 and a STA 2. It should be understood that a method described in the embodiments of this application is also applicable to communication between APs, communication between STAs, and the like.

A structure of each of the AP and the STA in the embodiments of this application may include a media access control (MAC) layer and a physical (PHY) layer. The AP and the STA may perform information transmission by using a physical layer protocol data unit (PHY Protocol Data Unit, PPDU). In addition, a frame structure of the PPDU varies with a wireless communications protocol used by the AP and the STA For example, when the wireless communications protocol used by the AP and the STA is 802.11n, the frame structure of the PPDU is shown in FIG. 2. The frame structure of the PPDU includes a legacy short training field (L-STF), a legacy long training field (L-LTF), a legacy signal field (L-SIG), a high throughput signaling field (HT-SIG), a high throughput short training field (HT-STF), a high throughput long training field HT-LTF), and a data field. It should be noted that the L-STF, the L-LTF. and the L-SIG in the foregoing fields may be referred to as legacy preambles.

When the wireless communications protocol used by the AP and the STA is 802.1 lac, the frame structure of the PPDU is shown in FIG. 3. The frame structure of the PPDU includes an L-STF, an L-LTF. an L-SIG. a very high throughput field A (VHT-SIG-A), a very high throughput short training field (VHT-STF), a very high throughput long training field (VHT-LTF), a very high throughput field B (VHT-SIG-B), and a data field.

It should be noted that the foregoing uses only the frame structures of the PPDUs in 802.11n and 802.11ac as examples for description. The PPDU in the embodiments of this application is mainly a next-generation Wi-Fi PPDU with an ultra-high bandwidth, and the foregoing frame structures of the PPDUs do not constitute a limitation on the embodiments of this application.

FIG. 4 is a schematic flowchart of an information transmission method according to an embodiment of this application. Referring to FIG. 4, the method includes the following several steps.

Step 401: A wireless communications device generates a physical layer protocol data unit PPDU with a bandwidth of X MHz, where X>160, some or all fields in the PPDU are rotated in the bandwidth of X MHz by using a rotation factor sequence, the rotation factor sequence includes n rotation factors, the bandwidth of X MHz includes n bandwidths of Y MHz, and each bandwidth of Y MHz is corresponding to one rotation factor.

The wireless communications device may be an AP or a STA When the wireless communications device is an AP, the AP may perform information transmission with another AP or an STA by using the PPDU with the bandwidth of X MHz. When the wireless communications device is a STA, the STA may perform information transmission with an AP or another STA by using the PPDU with the bandwidth of X MHz.

In this embodiment of this application, if a field carried on a bandwidth of Y MHz is multiplied by a non-1 rotation factor, this case is defined as that the field in the bandwidth of Y MHz is rotated.

In addition, the bandwidth of X MHz is greater than 160 MHz. For example, X MHz may be 180 MHz, 200 MHz, 240 MHz, 280 MHz, 300 MHz, 320 MHz, or the like. This is not specifically limited in this embodiment of this application. Y MHz may be 20 MHz. 10 MHz, 5 MHz, 2 MHz, or the like. This is not specifically limited in this embodiment of this application. A value of each of the n rotation factors included in the rotation factor sequence may be 1, - 1, j, or -j, where a rotation angle corresponding to the rotation factor 1 is 0 degrees, a rotation angle corresponding to the rotation factor -1 is 180 degrees, a rotation angle corresponding to the rotation factor j is 90 degrees, and a rotation angle corresponding to the rotation factor -j is -90 degrees.

In addition, the PPDU may include a plurality of fields. For example, the PPDU may include fields shown in FIG. 2 or FIG. 3. That some or all fields in the PPDU are rotated in the bandwidth of X MHz by using a rotation factor sequence may include: some fields in the PPDU are rotated in the bandwidth of X MHz by using the rotation factor sequence, and the other fields in the PPDU are not rotated in the bandwidth of X MHz by using the rotation factor sequence; or all the fields in the PPDU are rotated in the bandwidth of X MHz by using the rotation factor sequence.

Alternatively, that some or all fields in the PPDU are rotated in the bandwidth of X MHz by using a rotation factor sequence may be understood as that each of the some or all fields in the PPDU is rotated in the bandwidth of X MHz by using the rotation factor sequence, that is, each field in the some fields in the PPDU is rotated in the n bandwidths of Y MHz by using the rotation factor sequence, or each field in the PPDU is rotated in the n bandwidths of Y MHz by using the rotation factor sequence.

The X-MHz PPDU includes a plurality of fields in time domain, and includes n bandwidths of Y MHz in frequency domain. Each field in time domain is corresponding to n bandwidths of Y MHz in frequency domain. For the n bandwidths of Y MHz corresponding to each field, each of the n bandwidths of Y MHz may carry the field (that is, the n bandwidths of Y MHz corresponding to the field are fully occupied), or a blank bandwidth of Y MHz that does not carry the field may exist in the n bandwidths of Y MHz, but other fields do not occupy the blank bandwidth of Y MHz.

In addition, when a blank bandwidth of Y MHz exists in n bandwidths of Y MHz corresponding to a field in the PPDU, when the field is rotated by using the rotation factor sequence, a rotation factor corresponding to the blank bandwidth of Y MHz is not used.

Using the frame structure of the PPDU shown in FIG. 2 as an example, each of the L-STF. the L-LTF, the L-SIG, and the HT-SIG field in the PPDU may be rotated in n bandwidths of Y MHz by using the rotation factor sequence, and each of the HT-STF, the HT-LTF. and the data field. may not be rotated in the n bandwidths of Y MHz by using the rotation factor sequence. Alternatively, all the fields (that is, the L-STF, the L-LTF, the L-SIG, the HT-SIG, the HT-STF, the HT-LTF, and the data field) shown in FIG. 2 are rotated in n bandwidths of Y MHz by using a rotation factor sequence.

In addition, a transmission mode of some fields in the PPDU on the n bandwidths of Y MHz may be duplicate transmission, and the some fields may include the L-STF, the L-LTF, and the L-SIG. Each of the L-STF, the L-LTF. and the L-S1G may be rotated by using the rotation factor sequence, that is, a legacy preamble in the PPDU may be transmitted on the n bandwidths of Y MHz after being duplicated and rotated. Sequences of legacy preambles on all the bandwidths of Y MHz are the same, but the sequences of the legacy preambles are rotated at a specific angle on different bandwidths of Y MHz. A field in the PPDU other than the legacy preamble may be transmitted in a non-duplicate or duplicate mode, that is, content of the field other than the legacy preamble on all the bandwidths of Y MHz is different or the same.

For ease of understanding, herein, the frame structure of the PPDU shown in FIG. 2 is used as an example to describe a field transmitted in a duplicate mode and a field transmitted in a non-duplicate mode that are in the PPDU with the bandwidth of X MHz. It is assumed that X=200, Y=20, a transmission mode of the L-STF, the L-LTF, the L-SIG, and the HT-SIG field in the PPDU is duplicate transmission, and a transmission mode of the HT-STF, the HT-LTF, and the data field in the PPDU is non-duplicate transmission, the PPDU with a bandwidth of 200 MHz may be shown in FIG. 5.

Figure 5:
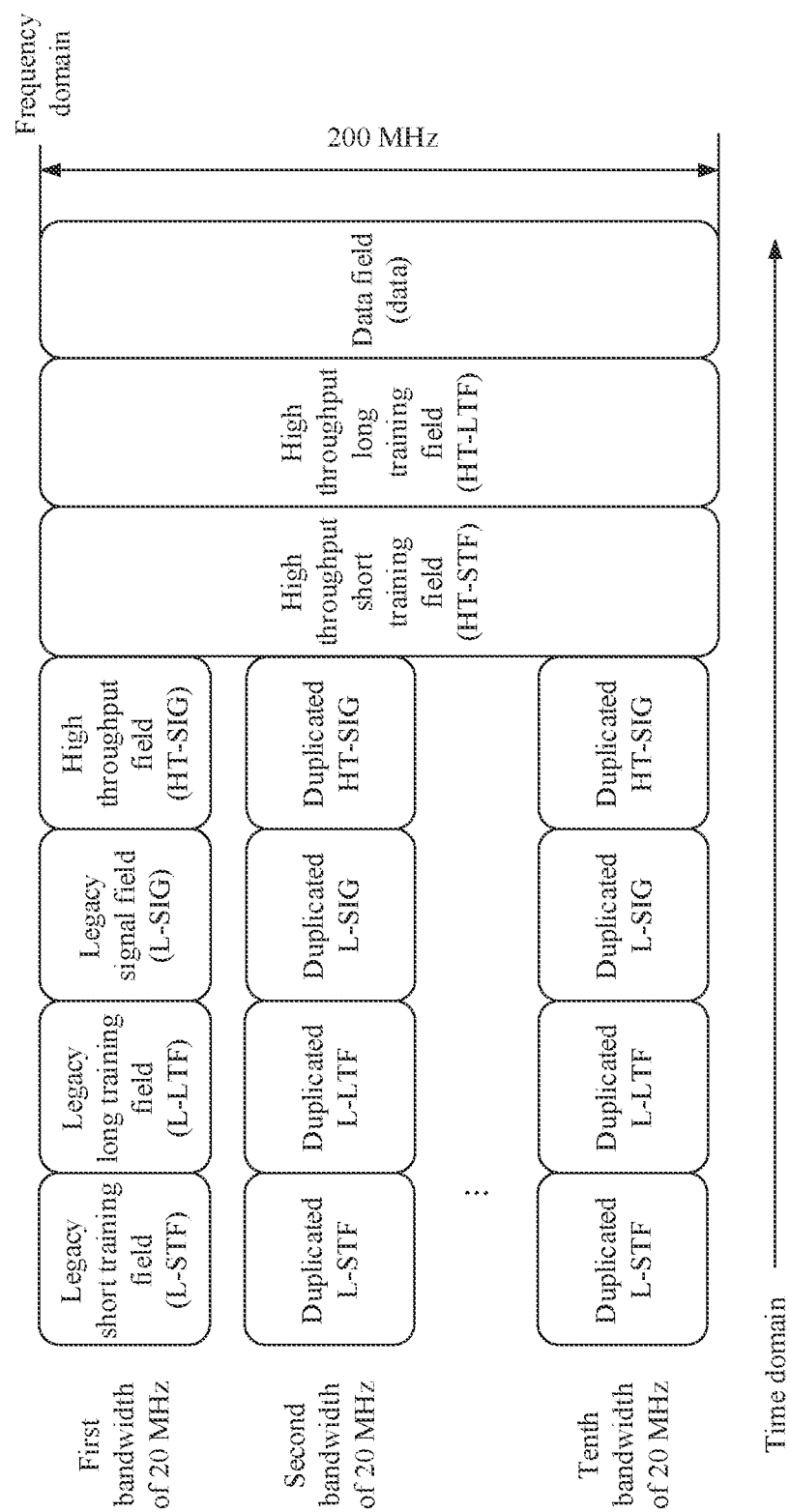
FIG. 5 is a schematic diagram of a 200-MHz PPDU according to an embodiment of this application.
Figure 6:
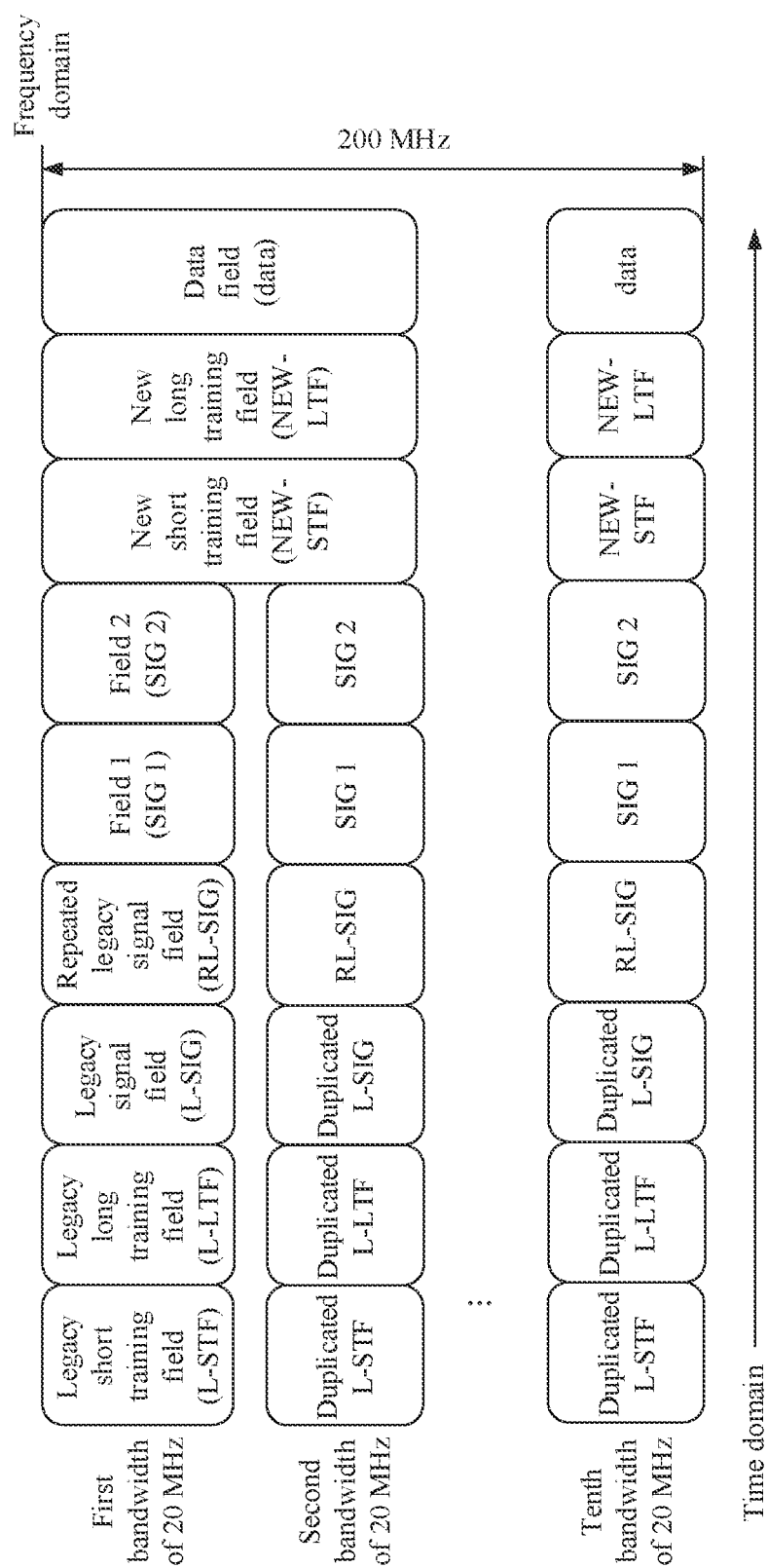
FIG. 6 is a schematic diagram of another 200-MHz PPDU according to an embodiment of this application.

A maximum bandwidth of an 802.11n PPDU is 40 MHz, and a structure of the PPDU shown in FIG. 5 is a PPDU with an ultra-high bandwidth provided based on a structure of the 802.11n PPDU. This application is based on a structure of a next-generation Wi-Fi PPDU (a next generation of 802.11ax) with an ultra-high bandwidth. Because a field included in the PPDU is unknown, the structure of the PPDU with the ultra-high bandwidth is shown in FIG. 6. The structure of the PPDU includes a legacy preamble, a repeated legacy signal field (RL-SIG), a signaling field 1 SIG 1), a signaling field 2 (SIG 2), a new short training field (NEW-STF), a new long training field (NEW-LTF), and a data field (data). The PPDU may be an OFDMA PPDU. or may be a non-OFDMA PPDU. It should be noted that a field included in the next-generation PPDU does not constitute a limitation on an implementation of this application.

Specifically, when the wireless communications device generates the PPDU with the bandwidth of X MHz, for some or all the fields in the PPDU, a frequency domain signal corresponding to the some or all fields carried on each of the n bandwidths of Y MHz included in the bandwidth of X MHz may be multiplied by a rotation factor corresponding to the bandwidth of Y MHz, that is, products of the frequency domain signals corresponding to the some or all fields and a rotation factor sequence is obtained, and then inverse fast Fourier transform (IFFT) is performed on the products to obtain time-domain signals corresponding to the some or all fields.

For example, it is assumed that the frequency domain signals corresponding to the some or all fields are [Y1, Y2..... Yn], and n rotation factors are [K1, K2..... Kn], where Y1 to Yn respectively represent the frequency domain signals corresponding to the n bandwidths of Y MHz, and K1 to Kn respectively represent rotation factors corresponding to the n bandwidths of Y MHz. In this case, the products of the frequency domain signals corresponding to the some or all fields and the rotation factor sequence may be represented as (Y1*K1, Y2*K2, ..., Yn*Kn], and the time-domain signals corresponding to the some or all fields may be represented as IFFT [Y1*K1, Y2*K2, ..., Yn*Kn*].

Correspondingly, during calculation of a peak to average power ratio (PAPR) of the some or all fields based on the time-domain signals corresponding to the some or all fields, oversampling may be performed on the time-domain signals corresponding to the some or all fields, to obtain an analog domain signal. For example, five-times oversampling is performed Assuming that a time-domain signal obtained by oversampling is Si, a PAPR may be calculated according to the following formula (1). In the formula, max represents an operation of solving a maximum value, and mean represents an averaging operation.

$$PAPR = 10\log_{10}\left(\frac{\max(S_i^2)}{\text{mean}(S_i^2)}\right) \quad (1)$$

Further, the PPDU with the bandwidth of X MHz includes a plurality of fields, and is transmitted on an X-MHz channel including n bandwidths of Y MHz. At least some fields in the PPDU carried on the n bandwidths of Y MHz are multiplied by n rotation factors in a vector in frequency domain in a one-to-one correspondence, where the at least some fields, carried on each bandwidth of Y MHz, of the PPDU are multiplied by a same coefficient of the rotation factor vector, that is, data carried on all subcarriers included in the bandwidths of Y MHz is multiplied by a same coefficient. In this way. PAPRs of the at least some fields in the PPDU are reduced. Through computer simulation, it is learned that there is very little difference between a PAPR obtained by multiplying a field by a rotation factor selected from any complex number and a PAPR obtained by multiplying the field by a rotation factor selected from a fixed set. To simplify implementation and reduce product implementation complexity, the fixed set to which the selected rotation factor belongs in this application is [ 1, -1, j, -j].

Further, each bandwidth of Y MHz may include a plurality of subcarriers. For example, when Y=20, each bandwidth of 20 MHz may include 64 subcarriers, 128 subcarriers, 256 subcarriers, or 512 subcarriers. When the wireless communications device generates the PPDU with the bandwidth of X MHz, an intermediate subcarrier of subcarriers at two sideband parts with the bandwidth of X MHz may carry no signal. In this way, adjacent-band interference and direct current interference can be avoided. To be compatible with a PPDU with a low bandwidth, each bandwidth of 20 MHz that carries a legacy preamble may alternatively include a sideband subcarrier and carry no signal.

Figure 7:
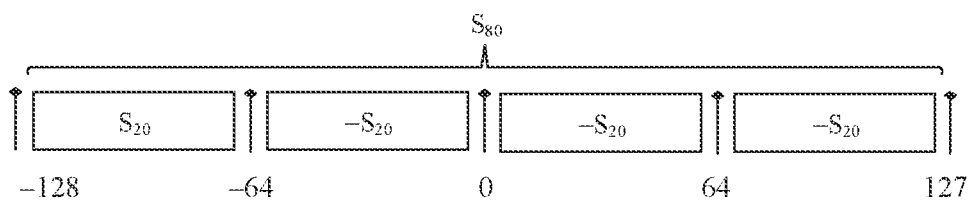
FIG. 7 is a schematic diagram of information transmission on 80 MHz according to an embodiment of this application.

As shown in FIG. 7, an example in which a bandwidth of 80 MHz includes four bandwidths of 20 MHz and each bandwidth of 20 MHz includes 64 subcarriers is used herein. Sequence numbers of the subcarriers included in the bandwidth of 80 MHz may be represented as -128 to 127. In FIG. 7, subcarriers whose subcarrier sequence numbers are -128 to -123 and 123 to 127 are subcarriers at a sideband part, and three subcarriers whose subcarrier sequence numbers are -1 to 1 are intermediate subcarriers. In this case, no signal may be carried on the subcarriers whose subcarrier sequence numbers are -128 to -123, 123 to 127, and -1 to 1. Sequence numbers of sideband subcarriers on the bandwidth of 20 MHz are -32 to -27 and 27 to 31. It should be noted that in this embodiment of this application, only the bandwidth of 80 MHz is used as an example for description. A bandwidth of X MHz greater than 160 MHz may also be designed according to the foregoing manner used for the bandwidth of 80 MHz. This is not described again in this embodiment of this application.

Step 402: The wireless communications device sends the PPDU with the bandwidth of X MHz.

After generating the PPDU with the bandwidth of X MHz, the wireless communications device may send the PPDU with the bandwidth of X MHz to another wireless communications device. Correspondingly, the wireless communications device on a receive side may perform corresponding rotation recovery on the received PPDU with the bandwidth of X MHz, to obtain the PPDU before rotation. Alternatively, a rotation factor is directly used as a part of a channel, and the rotation factor is removed through channel estimation and channel equalization.

Specifically, for each bandwidth of Y MHz, the wireless communications device on the receive side may alternatively perform rotation recovery on a field in the bandwidth of Y MHz by multiplying the field by a rotation factor. For example, when a rotation factor that is corresponding to the bandwidth of Y MHz and that is used on a transmit side is 1, the rotation factor used when the corresponding rotation recovery is performed on the receive side may be 1, or the receive side does not perform rotation recovery on a field in a bandwidth of Y MHz corresponding to the rotation factor 1. When a rotation factor that is corresponding to the bandwidth of Y MHz and that is used on a transmit side is -1, the rotation factor used when the corresponding rotation recovery is performed on the receive side may be -1. When a rotation factor that is corresponding to the bandwidth of Y MHz and that is used on a transmit side is -j, the rotation factor used when the corresponding rotation recovery is performed on the receive side may be j. When a rotation factor that is corresponding to the bandwidth of Y MHz and that is used on a transmit side is j, the rotation factor used when the corresponding rotation recovery is performed on the receive side may be -j.

Figure 8:
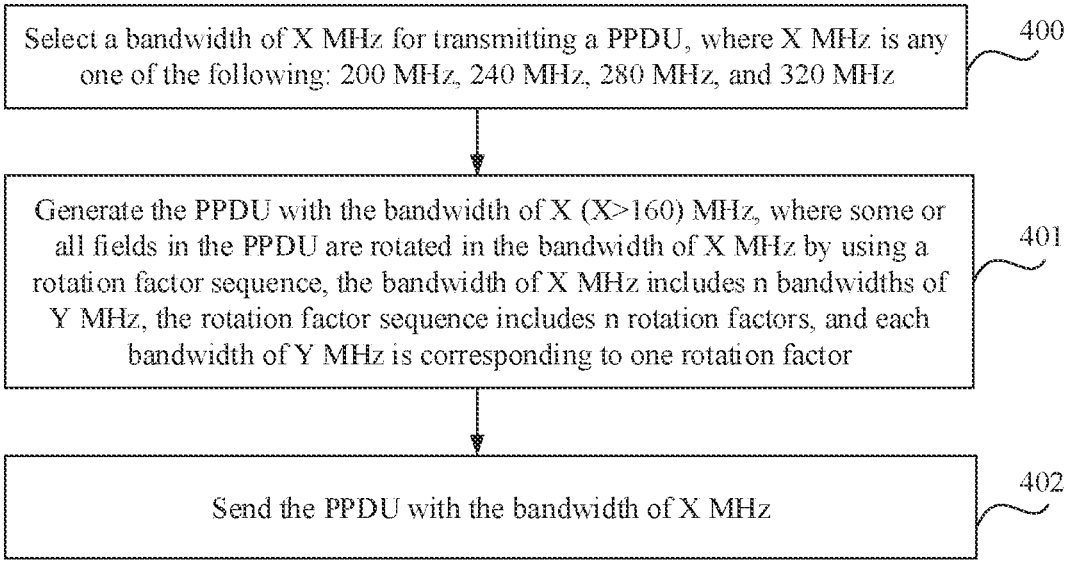
FIG. 8 is a schematic flowchart of another information transmission method according to an embodiment of this application.

Further, referring to FIG. 8, before step 401, the method further includes step 400.

Step 400: The wireless communications device selects the bandwidth of X MHz for transmitting the PPDU, where X MHz is any one of the following: 200 MHz, 240 MHz, 280 MHz, and 320 MHz.

Specifically, the wireless communications device may select, from a plurality of bandwidths, the bandwidth of X MHz for transmitting the PPDU, where the plurality of bandwidths may include 200 MHz, 240 MHz, 280 MHz, and 320 MHz, and the selected bandwidth of X MHz may be any one of 200 MHz. 240 MHz, 280 MHz, and 320 MHz.

In this embodiment of this application, when X MHz is 200 MHz, 240 MHz, 280 MHz, or 320 MHz, and Y=20, the rotation factor sequence may include a rotation factor corresponding to a current bandwidth of 80 MHz, or may not include the rotation factor corresponding to the current bandwidth of 80 MHz. When the rotation factor sequence includes the rotation factor corresponding to the current bandwidth of 80 MHz, the first four rotation factors in the rotation factor sequence are rotation factors corresponding to the current bandwidth of 80 MHz, that is, the first four rotation factors in the rotation factor sequence are [1 -1 -1 -1]. The following uses (I) to (IV) to respectively describe in detail rotation factor sequences used when the bandwidth of X MHz is 200 MHz, 240 MHz, 280 MHz, and 320 MHz.

It should be noted that, in rotation factor sequences shown in the following tables, a rotation angle corresponding to a rotation factor 1 is 0 degrees, a rotation angle corresponding to a rotation factor -1 is 180 degrees, a rotation angle corresponding to a rotation factor j is 90 degrees, and a rotation angle corresponding to a rotation factor -j is -90 degrees. In this embodiment of this application, only 200 MHz is used as an example. A rotation angle sequence corresponding to a rotation factor sequence corresponding to 200 MHz is listed. To be specific, each rotation factor in the rotation factor sequence corresponding to 200 MHz is converted into a corresponding rotation angle, to obtain the corresponding rotation angle sequence.

(I) When X=200, n= 10, that is, a length of the rotation factor sequence is 10.

If the rotation factor sequence includes the rotation factor corresponding to the current bandwidth of 80 MHz, the rotation factor sequence corresponding to the bandwidth of 200 MHz starts from the four rotation factors corresponding to the current bandwidth of 80 MHz. The rotation factor sequence is specifically shown in the following Table 1-1, and a rotation angle sequence corresponding to the rotation factor sequence is [0 180 180 180 180 -90 90 -90 180 0],

TABLE 1-1

| Sequence number | Rotation factor sequence |
|---|---|
| 1 | 1 -1 -1 -1 -1 -j j -j -1 1 |

When the rotation factor sequence shown in Table 1-1 is used, PAPRs corresponding to legacy preambles (that is, the L-STF, the L-LTF, and the L-SIG field) included in the frame structure of the PPDU may be shown in the following Table 1-2.

TABLE 1-2

| Field | L-STF | L-LTF (including a cyclic prefix) | L-LTF (excluding a cyclic prefix) | L-SIG |
|---|---|---|---|---|
| PAPR | 3.5063 | 4.5770 | 4.5404 | 7.5778 |

If the rotation factor sequence does not include the rotation factor corresponding to the current bandwidth of 80 MHz, the rotation factor sequence corresponding to the bandwidth of 200 MHz may be any one of rotation factor sequences shown in the following Table 1-3.

TABLE 1-3

| Sequence number | Rotation factor sequence |
|---|---|
| 1 | 1 1 1 j -1 -j j -j -1 j |
| 2 | 1 1 1 -j -1 j -j -j -1 -j |
| 3 | 1 1 j -1 -j j -j -1 j 1 |
| 4 | 1 1 -j -1 j -j j -1 -j 1 |
| 5 | 1 j 1 j 1 -j -1 j -1 -j |
| 6 | 1 j 1 j -j 1 -j -1 -j j |
| 7 | 1 j 1 -j -1 j -1 -j -1 j |
| 8 | 1 j 1 -j -1 j -1 -j 1 j |
| 9 | 1 j j j 1 -j -1 1 -1 -j |

TABLE 1-3-continued

| Sequence number | Rotation factor sequence |
|---|---|
| 10 | 1 j -1 1 -1 j 1 -j -j -j |
| 11 | 1 j -1 j 1 -j -1 -j -1 -j |
| 12 | 1 j -1 j -1 j 1 -j -1 -j |
| 13 | 1 j -1 -1 -1 j 1 -j j -j |
| 14 | 1 j -1 -j 1 -j 1 -j -1 j |
| 15 | 1 j -1 -j 1 -j -1 j 1 j |
| 16 | 1 j -1 -j j -j -1 j 1 1 |
| 17 | 1 j -1 -j -1 j 1 -j 1 -j |
| 18 | 1 j -1 -j -1 -j -1 j 1 -j |
| 19 | 1 j -1 -j -j -j -1 j 1 -1 |
| 20 | 1 j -j j 1 -j -1 -1 -1 -j |
| 21 | 1 -1 1 j -1 -j -j -j -1 j |
| 22 | 1 -1 1 -j -1 j j j -1 -j |
| 23 | 1 -1 j 1 -j -j -j 1 j -1 |
| 24 | 1 -1 -j 1 j j j 1 -j -1 |
| 25 | 1 -j 1 j -1 -j -1 j 1 -j |
| 26 | 1 -j 1 j -1 -j -1 -j -1 j |
| 27 | 1 -j 1 -j -1 j 1 -j -1 j |
| 28 | 1 -j 1 -j -1 j 1 -j 1 -j |
| 29 | 1 -j j -j 1 j -1 -1 -1 j |
| 30 | 1 -j -1 1 -1 -j 1 j j j |
| 31 | 1 -j -1 j 1 j 1 j -1 -j |
| 32 | 1 -j -1 j 1 -j -j 1 -j |
| 33 | 1 -j -1 j j 1 -j -j 1 -1 |
| 34 | 1 -j -1 j -1 j -1 -j 1 j |
| 35 | 1 -j -1 j -1 -j 1 j -j |
| 36 | 1 -j -1 j -j j -1 -j 1 1 |
| 37 | 1 -j -1 -1 -1 -j 1 j -j j |
| 38 | 1 -j -1 -j 1 j -1 j -1 j |
| 39 | 1 -j -1 -j -1 j 1 j -1 j |
| 40 | 1 -j -j -j 1 j -1 1 -1 j |

When each rotation factor in the rotation factor sequences shown in Table 1-3 is converted into a corresponding rotation angle, an obtained rotation angle sequence is specifically shown in the following Table 1-4.

TABLE 1-4

| Sequence number | Rotation angle sequence |
|---|---|
| 1 | 0 0 0 90 180 -90 90 -90 180 90 |
| 2 | 0 0 0 -90 180 90 -90 90 180 -90 |
| 3 | 0 0 90 180 -90 90 -90 180 90 0 |
| 4 | 0 0 -90 180 90 -90 90 180 -90 0 |
| 5 | 0 90 0 90 0 -90 180 90 180 -90 |
| 6 | 0 90 0 90 180 -90 0 -90 180 90 |
| 7 | 0 90 0 -90 180 90 180 90 180 -90 |
| 8 | 0 90 0 -90 180 90 180 -90 0 90 |
| 9 | 0 90 90 90 0 -90 180 0 180 -90 |
| 10 | 0 90 180 0 180 90 0 -90 -90 -90 |
| 11 | 0 90 180 90 0 -90 180 -90 180 -90 |
| 12 | 0 90 180 90 180 90 0 -90 180 -90 |
| 13 | 0 90 180 180 180 90 0 -90 90 -90 |
| 14 | 0 90 180 -90 0 -90 0 -90 180 90 |
| 15 | 0 90 180 -90 0 -90 180 90 0 90 |
| 16 | 0 90 180 -90 90 -90 180 90 0 0 |
| 17 | 0 90 180 -90 180 90 0 -90 0 -90 |
| 18 | 0 90 180 -90 180 -90 180 90 0 -90 |
| 19 | 0 90 180 -90 -90 -90 180 90 0 180 |
| 20 | 0 90 -90 90 0 -90 180 180 180 -90 |
| 21 | 0 180 0 90 180 -90 -90 -90 180 90 |
| 22 | 0 180 0 -90 180 90 90 90 180 -90 |
| 23 | 0 180 90 0 -90 -90 -90 0 90 180 |
| 24 | 0 180 -90 0 90 90 90 0 -90 180 |
| 25 | 0 -90 0 90 180 -90 180 90 0 -90 |
| 26 | 0 -90 0 90 180 -90 180 -90 180 90 |
| 27 | 0 -90 0 -90 0 90 180 -90 180 90 |
| 28 | 0 -90 0 -90 180 90 0 90 180 -90 |
| 29 | 0 -90 90 -90 0 90 180 180 180 90 |

TABLE 1-4-continued

| Sequence number | Rotation angle sequence | | | | | | | | | |
|---|---|---|---|---|---|---|---|---|---|---|
| 30 | 0 | -90 | 180 | 0 | 180 | -90 | 0 | 90 | 90 | 90 |
| 31 | 0 | -90 | 180 | 90 | 0 | 90 | 0 | 90 | 180 | -90 |
| 32 | 0 | -90 | 180 | 90 | 0 | 90 | 180 | -90 | 0 | -90 |
| 33 | 0 | -90 | 180 | 90 | 90 | 90 | 180 | -90 | 0 | 180 |
| 34 | 0 | -90 | 180 | 90 | 180 | 90 | 180 | -90 | 0 | 90 |
| 35 | 0 | -90 | 180 | 90 | 180 | -90 | 0 | 90 | 0 | 90 |
| 36 | 0 | -90 | 180 | 90 | -90 | 90 | 180 | -90 | 0 | 0 |
| 37 | 0 | -90 | 180 | 180 | 180 | -90 | 0 | 90 | -90 | 90 |
| 38 | 0 | -90 | 180 | -90 | 0 | 90 | 180 | 90 | 180 | 90 |
| 39 | 0 | -90 | 180 | -90 | 180 | -90 | 0 | 90 | 180 | 90 |
| 40 | 0 | -90 | -90 | -90 | 0 | 90 | 180 | 0 | 180 | 90 |

When any one of the rotation factor sequences shown in Table 1-3 is used, PAPRs corresponding to legacy preambles (that is, the L-STF, the L-LTF, and the L-SIG field) included in the frame structure of the PPDU may be shown in the following Table 1-5.

TABLE 1-5

| Field | L-STF | L-LTF (including a cyclic prefix) | L-LTF (excluding a cyclic prefix) | L-SIG |
|---|---|---|---|---|
| PAPR | 3.0566 | 3.9682 | 3.9321 | 7.0277 |

(II) When X=240, n=12, that is, a length of the rotation factor sequence is 12.

If the rotation factor sequence includes the rotation factor corresponding to the current bandwidth of 80 MHz, the rotation factor sequence corresponding to the bandwidth of 240 MHz starts from the four rotation factors corresponding to the current bandwidth of 80 MHz. The rotation factor sequence is specifically shown in the following Table 2-1.

TABLE 2-1

| Sequence number | Rotation factor sequence | | | | | | | | | | | |
|---|---|---|---|---|---|---|---|---|---|---|---|---|
| 1 | 1 | -1 | -1 | -1 | 1 | 1 | 1 | 1 | -1 | 1 | 1 | -1 |
| 2 | 1 | -1 | -1 | -1 | 1 | -1 | 1 | 1 | -1 | 1 | 1 | 1 |
| 3 | 1 | -1 | -1 | -1 | j | -1 | 1 | -1 | -1 | 1 | -j | 1 |
| 4 | 1 | -1 | -1 | -1 | -1 | 1 | 1 | 1 | -1 | 1 | -1 | -1 |
| 5 | 1 | -1 | -1 | -1 | -1 | 1 | -1 | -1 | 1 | -1 | 1 | 1 |
| 6 | 1 | -1 | -1 | -1 | -1 | -1 | 1 | 1 | -1 | 1 | -1 | 1 |
| 7 | 1 | -1 | -1 | -1 | -j | -1 | 1 | -1 | -1 | 1 | j | 1 |

When any one of the rotation factor sequences shown in Table 2-1 is used, PAPRs corresponding to legacy preambles (that is, the L-STF, the L-LTF, and the L-SIG field) included in the frame structure of the PPDU may be shown in the following Table 2-2.

TABLE 2-2

| Field | L-STF | L-LTF (including a cyclic prefix) | L-LTF (excluding a cyclic prefix) | L-SIG |
|---|---|---|---|---|
| PAPR | 3.4872 | 4.4387 | 4.4026 | 7.4863 |

If the rotation factor sequence does not include the rotation factor corresponding to the current bandwidth of 80 MHz, the rotation factor sequence corresponding to the bandwidth of 240 MHz may be any one of rotation factor sequences shown in the following Table 2-3.

TABLE 2-3

| Sequence number | Rotation factor sequence | | | | | | | | | | | |
|---|---|---|---|---|---|---|---|---|---|---|---|---|
| 1 | 1 | 1 | 1 | 1 | 1 | -1 | -1 | 1 | -1 | 1 | -1 | -1 |
| 2 | 1 | 1 | 1 | 1 | -1 | 1 | 1 | -1 | 1 | -1 | -1 | -1 |
| 3 | 1 | 1 | 1 | 1 | -1 | -1 | 1 | -1 | 1 | -1 | -1 | 1 |
| 4 | 1 | 1 | 1 | 1 | -1 | -1 | -1 | 1 | -1 | 1 | 1 | -1 |
| 5 | 1 | 1 | 1 | j | 1 | -1 | 1 | 1 | -1 | -j | -1 | -1 |
| 6 | 1 | 1 | 1 | -1 | 1 | 1 | -1 | 1 | -1 | -1 | -1 | 1 |
| 7 | 1 | 1 | 1 | -1 | 1 | -1 | 1 | -1 | -1 | -1 | -1 | -1 |
| 8 | 1 | 1 | 1 | -1 | -1 | 1 | -1 | 1 | -1 | -1 | 1 | 1 |
| 9 | 1 | 1 | 1 | -1 | -1 | j | -1 | 1 | 1 | -1 | 1 | -j |
| 10 | 1 | 1 | 1 | -1 | -1 | -1 | 1 | -1 | 1 | 1 | -1 | 1 |
| 11 | 1 | 1 | 1 | -1 | -1 | -1 | -1 | 1 | -1 | -1 | 1 | -1 |
| 12 | 1 | 1 | 1 | -1 | -1 | -j | -1 | 1 | 1 | -1 | 1 | J |
| 13 | 1 | 1 | 1 | -j | 1 | -1 | 1 | 1 | -1 | j | -1 | -1 |
| 14 | 1 | 1 | j | 1 | j | -1 | 1 | 1 | -j | -1 | -j | -1 |
| 15 | 1 | 1 | j | 1 | -1 | 1 | 1 | -1 | -j | -1 | -1 | 1 |
| 16 | 1 | 1 | j | 1 | -1 | -1 | 1 | -1 | -j | -1 | -1 | -1 |
| 17 | 1 | 1 | j | -1 | j | -1 | 1 | 1 | -j | 1 | -j | -1 |
| 18 | 1 | 1 | -1 | 1 | 1 | 1 | -1 | -1 | -1 | 1 | -1 |
| 19 | 1 | 1 | -1 | 1 | 1 | -1 | -1 | -1 | -1 | -1 | 1 | 1 |
| 20 | 1 | 1 | -1 | 1 | j | 1 | 1 | 1 | -1 | -1 | -j | -1 |
| 21 | 1 | 1 | -1 | 1 | -1 | 1 | 1 | -1 | -1 | -1 | -1 | -1 |
| 22 | 1 | 1 | -1 | 1 | -1 | -1 | 1 | -1 | -1 | -1 | -1 | 1 |
| 23 | 1 | 1 | -1 | 1 | -1 | -1 | -1 | 1 | 1 | 1 | 1 | -1 |
| 24 | 1 | 1 | -1 | 1 | -j | 1 | 1 | 1 | -1 | -1 | j | -1 |
| 25 | 1 | 1 | -1 | j | 1 | j | 1 | 1 | -1 | -j | -1 | -j |
| 26 | 1 | 1 | -1 | J | -1 | j | 1 | 1 | -1 | -j | 1 | -j |
| 27 | 1 | 1 | -1 | j | -1 | -1 | 1 | 1 | 1 | -j | 1 | -1 |
| 28 | 1 | 1 | -1 | -1 | 1 | 1 | -1 | -1 | 1 | 1 | 1 | 1 |
| 29 | 1 | 1 | -1 | -1 | j | -1 | 1 | 1 | -1 | 1 | -j | 1 |
| 30 | 1 | 1 | -1 | -1 | -1 | 1 | -1 | 1 | 1 | -1 | 1 | 1 |
| 31 | 1 | 1 | -1 | -1 | -1 | j | -1 | 1 | -1 | -1 | 1 | -j |
| 32 | 1 | 1 | -1 | -1 | -1 | 1 | -1 | -1 | 1 | -1 | 1 | 1 |
| 33 | 1 | 1 | -1 | -1 | -1 | -1 | 1 | 1 | -1 | 1 | 1 | -1 |
| 34 | 1 | 1 | -1 | -1 | -1 | -j | 1 | 1 | -1 | -1 | 1 | j |
| 35 | 1 | 1 | -1 | -1 | -j | -1 | 1 | 1 | -1 | 1 | j | 1 |
| 36 | 1 | 1 | -1 | -j | 1 | -j | 1 | 1 | -1 | j | -1 | J |
| 37 | 1 | 1 | -1 | -j | -1 | -1 | 1 | 1 | 1 | j | 1 | -1 |
| 38 | 1 | 1 | -1 | -j | -1 | -j | 1 | 1 | -1 | j | 1 | j |
| 39 | 1 | 1 | -j | 1 | -1 | 1 | -1 | j | -1 | -1 | 1 |
| 40 | 1 | 1 | -j | 1 | -1 | -1 | -1 | j | -1 | -1 | -1 |
| 41 | 1 | 1 | -j | 1 | -j | -1 | 1 | 1 | j | -1 | j | -1 |
| 42 | 1 | 1 | -j | -1 | -j | -1 | 1 | 1 | j | 1 | j | -1 |
| 43 | 1 | j | 1 | 1 | -1 | -1 | -j | -1 | 1 | 1 | 1 |
| 44 | 1 | j | 1 | 1 | -1 | -1 | -j | -1 | 1 | -1 | -1 |
| 45 | 1 | j | 1 | 1 | -1 | -j | -1 | -j | 1 | 1 | -1 | j |
| 46 | 1 | j | 1 | j | 1 | -j | -1 | j | -1 | j | -1 | -j |
| 47 | 1 | j | 1 | j | j | -j | -1 | -j | -1 | j | j | -j |
| 48 | 1 | j | 1 | j | -1 | 1 | 1 | -j | -1 | -j | -1 | 1 |
| 49 | 1 | j | 1 | j | -1 | j | 1 | -j | -1 | -j | -1 | -j |
| 50 | 1 | j | 1 | j | -1 | -1 | 1 | -j | -1 | -j | -1 | -1 |
| 51 | 1 | j | 1 | j | -1 | -j | 1 | -j | 1 | -j | -1 | j |
| 52 | 1 | j | 1 | j | -1 | -j | -1 | J | -1 | j | 1 | -j |
| 53 | 1 | j | 1 | j | -j | -j | -1 | -j | -1 | j | -j | -j |
| 54 | 1 | j | 1 | -1 | 1 | 1 | -j | -1 | -1 | 1 | 1 |
| 55 | 1 | j | 1 | -1 | -1 | 1 | -j | -1 | -1 | -1 | -1 | 1 |
| 56 | 1 | j | 1 | -1 | -1 | -j | -1 | -j | 1 | -1 | -1 | j |
| 57 | 1 | j | 1 | -j | 1 | -1 | j | -1 | -j | -1 | -1 |
| 58 | 1 | j | 1 | -j | 1 | -j | 1 | j | -1 | -j | -1 | -j |
| 59 | 1 | j | 1 | -j | j | j | -1 | -j | -1 | -j | j | j |
| 60 | 1 | j | 1 | -j | -1 | j | -1 | j | -1 | -j | 1 | -j |
| 61 | 1 | j | 1 | -j | -1 | -j | 1 | -j | 1 | j | -1 | j |
| 62 | 1 | j | 1 | -j | -1 | -j | -1 | j | -1 | j | 1 | -j |
| 63 | 1 | j | 1 | -j | -j | -1 | -1 | -j | 1 | -j | -j | -j |
| 64 | 1 | j | j | j | -j | -1 | -j | j | -j | -j | -j |
| 65 | 1 | j | j | -1 | j | 1 | j | -j | 1 | -j |
| 66 | 1 | j | j | -1 | -j | -1 | j | -j | j | -j | 1 | j |
| 67 | 1 | j | j | -j | -j | -j | -1 | -j | j | -j | -j | j |
| 68 | 1 | j | -1 | 1 | 1 | -j | -1 | -j | -1 | 1 | 1 | j |
| 69 | 1 | j | -1 | 1 | 1 | -j | -1 | -j | -1 | -j | 1 | -j |
| 70 | 1 | j | -1 | j | 1 | 1 | -j | -1 | j | 1 | -j |
| 71 | 1 | j | -1 | j | 1 | 1 | -j | 1 | -j | 1 | -1 | 1 |

TABLE 2-3-continued

| Sequence number | Rotation factor sequence | | | | | | | | | | | |
|---|---|---|---|---|---|---|---|---|---|---|---|---|
| 72 | 1 | j | -1 | j | -1 | j | 1 | -j | -1 | -j | -1 | -j |
| 73 | 1 | j | -1 | j | -1 | -1 | 1 | -j | 1 | -j | -1 | -1 |
| 74 | 1 | j | -1 | j | -1 | -j | 1 | -j | -1 | -j | -1 | j |
| 75 | 1 | j | -1 | J | -1 | -j | -1 | j | 1 | j | 1 | -j |
| 76 | 1 | j | -1 | -1 | 1 | -1 | -j | -1 | -1 | 1 | j |
| 77 | 1 | j | -1 | -j | 1 | -j | 1 | -j | -1 | 1 | j |
| 78 | 1 | j | -1 | -j | -1 | j | -1 | j | 1 | -j | 1 | j |
| 79 | 1 | j | -1 | -j | -1 | -j | 1 | -j | -1 | j | -1 | j |
| 80 | 1 | j | -1 | -j | -1 | -j | -1 | J | 1 | -j | 1 | -j |
| 81 | 1 | j | -j | j | j | -j | -1 | -j | -j | j | j | j |
| 82 | 1 | j | -j | -j | j | -j | -1 | -j | -j | -j | j | j |
| 83 | 1 | j | -j | -j | -1 | -j | -1 | -j | -j | j | 1 | -j |
| 84 | 1 | j | -j | -j | -1 | -j | -1 | j | -j | -j | 1 | j |
| 85 | 1 | -1 | 1 | 1 | 1 | 1 | -1 | -1 | -1 | 1 | -1 | 1 |
| 86 | 1 | -1 | 1 | 1 | 1 | -1 | -1 | -1 | -1 | 1 | -1 | -1 |
| 87 | 1 | -1 | 1 | 1 | -1 | 1 | 1 | 1 | 1 | -1 | -1 | -1 |
| 88 | 1 | -1 | 1 | 1 | -1 | 1 | -1 | -1 | -1 | 1 | 1 | 1 |
| 89 | 1 | -1 | 1 | 1 | -1 | j | -1 | -1 | 1 | 1 | 1 | -j |
| 90 | 1 | -1 | 1 | 1 | -1 | -1 | -1 | -1 | 1 | 1 | 1 | -1 |
| 91 | 1 | -1 | 1 | 1 | -1 | -j | -1 | -1 | 1 | 1 | 1 | j |
| 92 | 1 | -1 | 1 | j | 1 | 1 | 1 | -1 | -1 | -j | -1 | 1 |
| 93 | 1 | -1 | 1 | -1 | 1 | 1 | -1 | -1 | -1 | -1 | -1 | 1 |
| 94 | 1 | -1 | 1 | -1 | -1 | 1 | 1 | 1 | 1 | 1 | -1 | -1 |
| 95 | 1 | -1 | 1 | -1 | -1 | -1 | -1 | -1 | -1 | -1 | 1 | 1 |
| 96 | 1 | -1 | 1 | -1 | -1 | -1 | -1 | 1 | 1 | 1 | -1 | 1 |
| 97 | 1 | -1 | 1 | -j | 1 | 1 | -1 | -1 | j | -1 | 1 |
| 98 | 1 | -1 | j | 1 | j | 1 | 1 | -1 | -j | -1 | -j | 1 |
| 99 | 1 | -1 | j | -1 | j | 1 | 1 | -1 | -j | 1 | -j | 1 |
| 100 | 1 | -1 | j | -1 | -1 | 1 | 1 | 1 | -j | 1 | -1 | 1 |
| 101 | 1 | -1 | j | -1 | -1 | -1 | 1 | 1 | -j | 1 | -1 | -1 |
| 102 | 1 | -1 | -1 | 1 | 1 | 1 | 1 | 1 | -1 | -1 | 1 | 1 |
| 103 | 1 | -1 | -1 | 1 | 1 | j | 1 | -1 | -1 | -1 | -j | -1 |
| 104 | 1 | -1 | -1 | 1 | 1 | -1 | 1 | -1 | -1 | -1 | -1 | -1 |
| 105 | 1 | -1 | -1 | 1 | -1 | 1 | -1 | -1 | 1 | 1 | 1 |
| 106 | 1 | -1 | -1 | 1 | -1 | j | -1 | -1 | -1 | 1 | 1 | -j |
| 107 | 1 | -1 | -1 | 1 | -1 | -1 | -1 | -1 | 1 | 1 | 1 | -1 |
| 108 | 1 | -1 | -1 | 1 | -1 | -j | -1 | -1 | -1 | 1 | 1 | j |
| 109 | 1 | -1 | -1 | 1 | -j | 1 | -1 | -1 | -1 | -1 | j | 1 |
| 110 | 1 | -1 | -1 | J | 1 | j | -1 | -1 | -j | -1 | -j |
| 111 | 1 | -1 | -1 | j | 1 | -1 | 1 | -1 | 1 | -j | 1 | 1 |
| 112 | 1 | -1 | -1 | j | -1 | j | -1 | 1 | -1 | -j | 1 | -j |
| 113 | 1 | -1 | -1 | -1 | 1 | 1 | 1 | -1 | 1 | 1 | -1 | 1 |
| 114 | 1 | -1 | -1 | -1 | 1 | -1 | 1 | 1 | -1 | 1 | 1 | 1 |
| 115 | 1 | -1 | -1 | -1 | j | -1 | 1 | -1 | -1 | 1 | -j | 1 |
| 116 | 1 | -1 | -1 | -1 | -1 | 1 | 1 | 1 | -1 | 1 | -1 | -1 |
| 117 | 1 | -1 | -1 | -1 | -1 | 1 | -1 | -1 | 1 | -1 | 1 | 1 |
| 118 | 1 | -1 | -1 | -1 | -1 | -1 | 1 | -1 | -1 | -1 | 1 | 1 |
| 119 | 1 | -1 | -1 | -1 | -j | -1 | 1 | -1 | -1 | 1 | j | 1 |
| 120 | 1 | -1 | -1 | -j | 1 | -j | 1 | -1 | -1 | j | -1 | j |
| 121 | 1 | -1 | -1 | -j | -1 | 1 | 1 | -1 | -1 | 1 | j | 1 |
| 122 | 1 | -1 | -1 | -j | -1 | -j | 1 | -1 | -1 | j | 1 | j |
| 123 | 1 | -1 | -j | 1 | -j | 1 | 1 | -1 | j | -1 | j | 1 |
| 124 | 1 | -1 | -j | -1 | -1 | 1 | 1 | 1 | j | 1 | -1 | 1 |
| 125 | 1 | -1 | -j | -1 | -1 | -1 | 1 | 1 | j | 1 | -1 | -1 |
| 126 | 1 | -1 | -j | -1 | -j | 1 | 1 | -1 | j | 1 | j | 1 |
| 127 | 1 | -j | 1 | 1 | 1 | -1 | -1 | j | -1 | 1 | 1 | -1 |
| 128 | 1 | -j | 1 | 1 | -1 | j | j | 1 | 1 | -1 | -j |
| 129 | 1 | -j | 1 | 1 | -1 | -1 | -1 | J | -1 | 1 | -1 | -1 |
| 130 | 1 | -j | 1 | j | 1 | j | -1 | -j | -1 | j | -1 | j |
| 131 | 1 | -j | 1 | j | 1 | -j | -1 | -j | -j | -1 | -1 | j |
| 132 | 1 | -j | 1 | j | j | -j | -1 | -j | -j | -1 | j | j |
| 133 | 1 | -j | 1 | j | -1 | -j | -1 | j | 1 | -j | -1 | -j |
| 134 | 1 | -j | 1 | j | -1 | -j | -1 | -j | j | -1 | 1 | j |
| 135 | 1 | -j | 1 | j | -1 | -j | -1 | -j | -1 | j | 1 | -j |
| 136 | 1 | -j | 1 | j | -j | -j | -1 | -j | 1 | -j | -j | -j |
| 137 | 1 | -j | 1 | -1 | 1 | 1 | -1 | j | -1 | -1 | 1 | 1 |
| 138 | 1 | -j | 1 | -1 | -1 | 1 | 1 | j | -1 | -1 | -1 | 1 |
| 139 | 1 | -j | 1 | -1 | -1 | -1 | -1 | j | 1 | -1 | -1 | -j |
| 140 | 1 | -j | 1 | -j | 1 | j | -1 | -j | -1 | -j | -1 | j |
| 141 | 1 | -j | 1 | -j | j | j | -1 | -j | -1 | -j | j | j |
| 142 | 1 | -j | 1 | -j | -1 | 1 | -1 | j | -1 | -1 | -1 | 1 |
| 143 | 1 | -j | 1 | -j | -1 | j | 1 | j | 1 | j | -1 | -j |
| 144 | 1 | -j | 1 | -j | -1 | j | -1 | -j | -1 | -j | 1 | j |
| 145 | 1 | -j | 1 | -j | -1 | -1 | 1 | j | -1 | j | -1 | -1 |
| 146 | 1 | -j | 1 | -j | -1 | -j | 1 | j | 1 | j | -1 | j |
| 147 | 1 | -j | 1 | -j | -j | j | -1 | -j | -1 | j | -j | j |
| 148 | 1 | -j | j | j | -1 | j | -1 | -j | j | j | 1 | -j |
| 149 | 1 | -j | j | j | -1 | -j | -1 | -j | j | j | 1 | j |
| 150 | 1 | -j | j | j | -j | j | -1 | J | j | j | -j | -j |
| 151 | 1 | -j | j | -j | -j | j | -1 | j | j | j | -j | -j |
| 152 | 1 | -j | -1 | 1 | 1 | -1 | j | -1 | j | 1 | 1 | -j |
| 153 | 1 | -j | -1 | 1 | j | 1 | 1 | -1 | -j | 1 | 1 | -j |
| 154 | 1 | -j | -1 | 1 | -1 | 1 | 1 | -1 | -j | -1 | -1 | -j |
| 155 | 1 | -j | -1 | J | -1 | j | -1 | -j | 1 | 1 | 1 | j |
| 156 | 1 | -j | -1 | j | -1 | -j | -1 | -j | 1 | j | 1 | -j |
| 157 | 1 | -j | -1 | -1 | 1 | j | -1 | j | -1 | -1 | 1 | -j |
| 158 | 1 | -j | -1 | -j | 1 | j | 1 | -1 | j | 1 | 1 | -j |
| 159 | 1 | -j | -1 | -j | 1 | -j | 1 | -1 | -j | 1 | 1 | j |
| 160 | 1 | -j | -1 | -j | -1 | 1 | 1 | 1 | j | 1 | -1 | 1 |
| 161 | 1 | -j | -1 | -j | -1 | 1 | 1 | -1 | -j | -1 | -1 | -j |
| 162 | 1 | -j | -1 | -j | -1 | j | -1 | -j | 1 | -j | 1 | j |
| 163 | 1 | -j | -1 | -j | -1 | -1 | 1 | j | 1 | j | -1 | -1 |
| 164 | 1 | -j | -1 | -j | -1 | -j | 1 | -j | 1 | -j | -1 | j |
| 165 | 1 | -j | -j | j | j | j | -1 | j | -j | j | j | -j |
| 166 | 1 | -j | -j | j | -1 | j | -1 | -j | -j | j | 1 | -j |
| 167 | 1 | -j | -j | j | -1 | -j | -1 | -j | -j | j | 1 | j |
| 168 | 1 | -j | -j | -j | j | j | -1 | j | -j | -j | j | -j |

When any one of the rotation factor sequences shown in Table 2-3 is used, PAPRs corresponding to legacy preambles (that is, the L-STF, the L-LTF, and the L-SIG field) included in the frame structure of the PPDU may be shown in the following Table 2-4.

TABLE 2-4

| PAPR | L-STF | L-LTF (including a cyclic prefix) | L-LTF (excluding a cyclic prefix) | L-SIG |
|---|---|---|---|---|
| Table 2-3 Rotation factor sequence | 3.4872 | 4.4387 | 4.4026 | 7.4863 |

(III) When X=280, n=14, that is, a length of the rotation factor sequence is 14.

If the rotation factor sequence includes the rotation factor corresponding to the current bandwidth of 80 MHz, the rotation factor sequence corresponding to the bandwidth of 280 MHz starts from the four rotation factors corresponding to the current bandwidth of 80 MHz. The rotation factor sequence is specifically shown in the following Table 3-1.

TABLE 3-1

| Sequence number | Rotation factor sequence | | | | | | | | | | | | | |
|---|---|---|---|---|---|---|---|---|---|---|---|---|---|---|
| 1 | 1 | -1 | -1 | -1 | j | 1 | -1 | j | -j | -j | -j | 1 | j | -j |
| 2 | 1 | -1 | -1 | -1 | j | 1 | -j | j | -j | -j | -j | 1 | j | -1 |
| 3 | 1 | -1 | -1 | -1 | j | -j | 1 | j | -j | -j | -j | 1 | -1 | j |
| 4 | 1 | -1 | -1 | -1 | j | -j | j | j | -j | -j | -j | 1 | -1 | 1 |
| 5 | 1 | -1 | -1 | -1 | -j | 1 | j | -j | j | j | j | 1 | -j | -1 |
| 6 | 1 | -1 | -1 | -1 | -j | 1 | -1 | -j | j | j | j | 1 | -j | j |
| 7 | 1 | -1 | -1 | -1 | -j | j | 1 | -j | -j | j | j | 1 | -1 | -j |
| 8 | 1 | -1 | -1 | -1 | -j | j | -j | -j | j | j | j | 1 | -1 | 1 |

When any one of the rotation factor sequences shown in Table 3-1 is used. PAPRs corresponding to legacy preambles (that is, the L-STF, the L-LTF, and the L-SIG field)

included in the frame structure of the PPDU may be shown in the following Table 3-2.

TABLE 3-2

| Field | L-STF | L-LTF (including a cyclic prefix) | L-LTF (excluding a cyclic prefix) | L-SIG |
|---|---|---|---|---|
| PAPR | 2.2581 | 3.2044 | 3.1681 | 6.237 |

(IV) When X=320, n=16 that is, a length of the rotation factor sequence is 16.

If the rotation factor sequence includes the rotation factor corresponding to the current bandwidth of 80 MHz, the rotation factor sequence corresponding to the bandwidth of 320 MHz starts from the four rotation factors corresponding to the current bandwidth of 80 MHz. The rotation factor sequence is specifically shown in the following Table 4-1.

factor. In this way, a PAPR of the PPDU can be reduced by using the rotation factor sequence. In addition, when X MHz is 200 MHz, 240 MHz, 280 MHz, or 320 MHz, the PAPR of the PPDU can further be reduced by using the rotation factor sequence provided in this embodiment of this application, so that PAPRs of the some or all fields in the PPDU is minimized.

The foregoing describes the solutions provided in the embodiments of this application. It may be understood that to implement the foregoing functions, an information transmission apparatus (for example, an AP or a STA) includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware

TABLE 4-1

| Sequence number | Rotation factor sequence |
|---|---|
| 1  | 1  -1  -1  -1   1   1   j  -j   1  -1   1   1   1   1  -j   j |
| 2  | 1  -1  -1  -1   1   1  -j   j   1  -1   1   1   1   1   j  -j |
| 3  | 1  -1  -1  -1   1   j   1  -j   1   1  -1   1   1  -j   1   j |
| 4  | 1  -1  -1  -1   1   j  -j   1   1   1   1  -1   1  -j   j   1 |
| 5  | 1  -1  -1  -1   1  -j   1   j   1   1  -1   1   1   j   1  -j |
| 6  | 1  -1  -1  -1   1  -j   j   1   1   1  -1   1   j  -j   1 |
| 7  | 1  -1  -1  -1   j   1   j  -1  -1  -1   1  -1  -j   1  -j  -1 |
| 8  | 1  -1  -1  -1   j   1  -1   J  -1  -1   1  -1  -j   1  -1  -j |
| 9  | 1  -1  -1  -1   j   j   1  -1  -1   1  -1  -1  -j  -j   1  -1 |
| 10 | 1  -1  -1  -1   j   j  -1   1  -1   1  -1  -1  -j  -j  -1   1 |
| 11 | 1  -1  -1  -1   j  -1   1   j  -1  -1   1  -j  -1   1  -j |
| 12 | 1  -1  -1  -1   j  -1   j   1  -1  -1   1  -1  -j  -1  -j   1 |
| 13 | 1  -1  -1  -1  -1   J  -1  -j   1   1  -1   1  -1  -j  -1   j |
| 14 | 1  -1  -1  -1  -1   j  -j  -1   1   1   1  -1  -1  -j   j  -1 |
| 15 | 1  -1  -1  -1  -1  -1   j  -j   1  -1   1   1  -1  -1  -j   j |
| 16 | 1  -1  -1  -1  -1  -1  -j   j   1  -1   1   1  -1  -1   j  -j |
| 17 | 1  -1  -1  -1  -1  -j   j  -1   1   1   1  -1  -1   j  -j  -1 |
| 18 | 1  -1  -1  -1  -1  -j  -1   j   1   1  -1   1  -1   j  -1  -j |
| 19 | 1  -1  -1  -1  -j   1  -1  -j  -1  -1   1   j   1  -1   j |
| 20 | 1  -1  -1  -1  -j   1  -j  -1  -1   1  -1   j   1   j  -1 |
| 21 | 1  -1  -1  -1  -j  -1   1  -j  -1  -1   1   j  -1   1   j |
| 22 | 1  -1  -1  -1  -j  -1  -j   1  -1  -1   1  -1   j  -1   j   1 |
| 23 | 1  -1  -1  -1  -j  -j   1  -1  -1   1  -1  -1   j   j   1  -1 |
| 24 | 1  -1  -1  -1  -j  -j  -1   1  -1   1  -1  -1   j   j  -1   1 |

When any one of the rotation factor sequences shown in Table 4-1 is used, PAPRs corresponding to legacy preambles (that is, the L-STF, the L-LTF, and the L-SIG field) included in the frame structure of the PPDU may be shown in the following Table 4-2.

TABLE 4-2

| Field | L-STF | L-LTF (including a cyclic prefix) | L-LTF (excluding a cyclic prefix) | L-SIG |
|---|---|---|---|---|
| PAPR | 2.8488 | 3.7764 | 3.7403 | 6.8093 |

In this embodiment of this application, the wireless communications device may generate and send the PPDU with the bandwidth of X MHz greater than 160 MHz, where the bandwidth of X MHz includes n bandwidths of Y MHz, some or all fields in the PPDU are rotated in the n bandwidths of Y MHz by using the rotation factor sequence, the rotation factor sequence includes n rotation factors, and each bandwidth of Y MHz is corresponding to one rotation and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9:
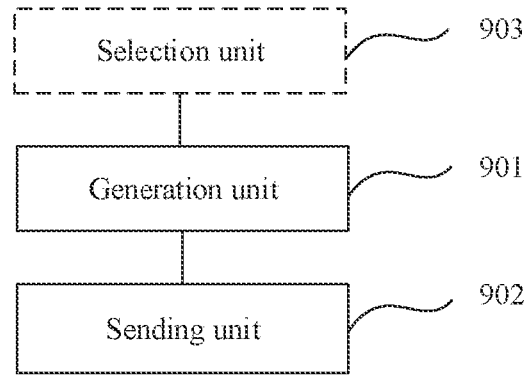
FIG. 9 is a schematic structural diagram of an information transmission apparatus according to an embodiment of this application.

In the embodiments of this application, the information transmission apparatus may be divided into function modules based on the foregoing method examples. For example, each function module corresponding to each function may be obtained through division, or two or more functions may be integrated into one processing module. The function module may be implemented in a form of hardware, or may be implemented in a form of a software function module. It should be noted that, in the embodiments of this application, module division is used as an example, and is merely logical function division. In actual implementation, another division manner may be used. The following uses division of each function module based on a corresponding function as an example for description:

FIG. 9 is a possible schematic structural diagram of the information transmission apparatus. The information transmission apparatus includes a generation unit 901 and a sending unit 902. The generation unit 901 is configured to support the information transmission apparatus in performing step 401 in the foregoing embodiment, and the sending unit 902 is configured to support the information transmission apparatus in performing step 402 in the foregoing embodiment. Further, the information transmission apparatus may further include a selection unit 903. The selection unit 903 is configured to support the information transmission apparatus in performing step 400 in the foregoing embodiment. All related content of the steps in the foregoing method embodiments may be cited in function descriptions of corresponding function modules. Details are not described herein.

Figure 10:
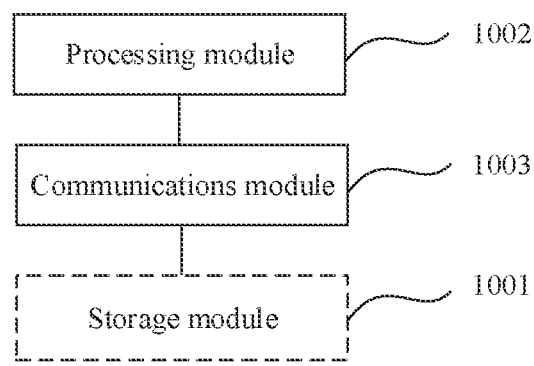
FIG. 10 is a schematic structural diagram of another information transmission apparatus according to an embodiment of this application.

FIG. 10 is another possible schematic structural diagram of the information transmission apparatus. The information transmission apparatus includes a processing module 1002 and a communications module 1003. The processing module 1002 is configured to control and manage actions of the information transmission apparatus. For example, the processing module 1002 is configured to support the information transmission apparatus in performing step 400 and step 401 in the foregoing embodiment, and/or is configured to perform another technical process described in this specification. The communications module 1003 is configured to support the information transmission apparatus in performing step 402 in the foregoing embodiment. Optionally, the information transmission apparatus may further include a storage module 1001 configured to store program code and data of the information transmission apparatus.

Based on hardware implementation, the storage module 1001 is a memory, the processing module 1002 may be a processor, and the communications module 1003 may be a communications interface. The communications interface may also be referred to as a transceiver, and the transceiver may be integration of a receiver and a transmitter.

Figure 11:
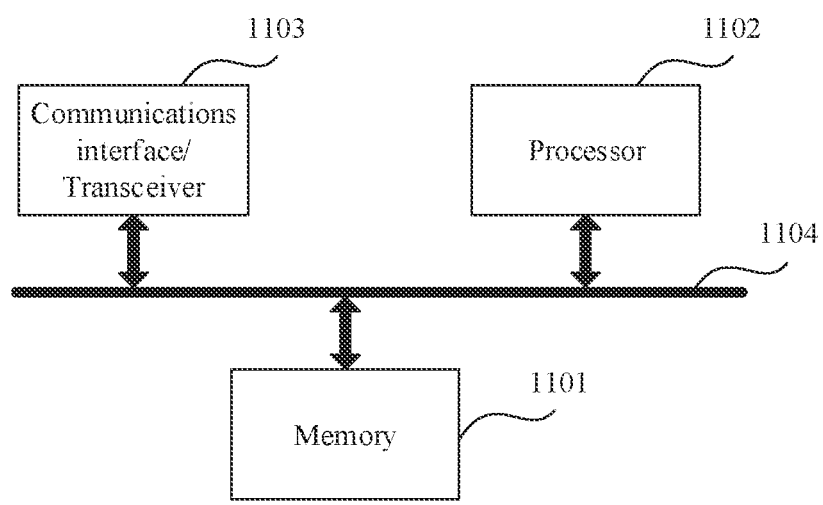
FIG. 11 is a schematic structural diagram of still another information transmission apparatus according to an embodiment of this application.

FIG. 11 is a structural diagram of a possible product form of the information transmission apparatus according to an embodiment of this application.

In a possible product form, the information transmission apparatus may be an information transmission device, and the information transmission device includes a processor 1102 and a transceiver 1103. The processor 1102 is configured to control and manage an action of the information transmission apparatus. For example, the processor 1102 is configured to support the information transmission apparatus in performing step 400 and step 401 in the foregoing embodiment, and/or is configured to perform another technical process described in this specification. The transceiver 1103 is configured to support the information transmission apparatus in performing step 402 in the foregoing embodiment. Optionally, the information transmission device may further include a memory 1101.

In another possible product form, the information transmission apparatus may be an information transmission board, and the information transmission board includes a processor 1102 and a transceiver 1103. The processor 1102 is configured to control and manage an action of the information transmission apparatus. For example, the processor 1102 is configured to support the information transmission apparatus in performing step 400 and step 401 in the foregoing embodiment, and/or is configured to perform another technical process described in this specification. The transceiver 1103 is configured to support the information transmission apparatus in performing step 402 in the foregoing embodiment. Optionally, the information transmission board may further include a memory 1101.

In another possible product form, the information transmission apparatus is also implemented by a general-purpose processor, namely, a commonly known chip. The general-purpose processor includes: a processor 1102 and a communications interface 1103. Optionally, the general-purpose processor may further include a memory 1101.

In another possible product form, the information transmission apparatus may also be implemented by using the following components: one or more FPGAs (field programmable gate arrays), a PLD (programmable logic device), a controller, a state machine, a gate logic, a discrete hardware component, any other suitable circuit, or any combination of circuits that can perform various functions described in this application.

The processor 1102 may be a central processing unit, a general-purpose processor, a digital signal processor, an application-specific integrated circuit, a field programmable gate array or another programmable logical device, a transistor logical device, a hardware component, or any combination thereof. The processor 1102 may implement or execute various example logical blocks, modules, and circuits described with reference to the content disclosed in this application. Alternatively, the processor 1102 may be a combination of processors implementing a computing function, for example, a combination of one or more microprocessors, or a combination of the digital signal processor and a microprocessor. The bus 1104 may be a peripheral component interconnect (PCI) bus, an extended industry standard architecture (EISA) bus, or the like. The bus 1104 may be classified into an address bus, a data bus, a control bus, and the like. For ease of representation, only one thick line is used to represent the bus 1104 in FIG. 11, but this does not mean that there is only one bus or only one type of bus.

A person of ordinary skill in the art may understand that all or some of the steps of the method embodiments may be implemented by a program instructing relevant hardware. The program instruction may be stored in a computer-readable storage medium. When the program instruction runs, the steps of the method embodiments are performed. The foregoing storage medium includes any medium that can store program code, such as a USB flash drive, a removable hard disk, a ROM, a RAM, a magnetic disk, or an optical disc.

According to one aspect, an embodiment of this application further provides a readable storage medium. The readable storage medium stores a computer-executable instruction, and when the computer-executable instruction is run, a device (which may be a single-chip microcomputer, a chip, a controller, or the like) or a processor is enabled to perform the steps in the information transmission method provided in this application.

According to one aspect, an embodiment of this application further provides a computer program product. The computer program product includes a computer-executable instruction, and the computer-executable instruction is stored in a computer-readable storage medium, at least one processor of a device may read the computer-executable instruction from the computer-readable storage medium, and the at least one processor executes the computer-executable instruction, so that the device performs the steps in the information transmission method provided in this application.

In an embodiment of this application, an information processing apparatus may generate a PPDU with a bandwidth of X MHz greater than 160 MHz and send the PPDU. The bandwidth of X MHz includes n bandwidth of Y MHz, some or all fields in the PPDU are rotated in the n bandwidths of Y MHz by using a rotation factor sequence, the rotation factor sequence includes n rotation factors, and each bandwidth of Y MHz corresponds to one rotation factor, so that a PAPR of the PPDU can be reduced by using the rotation factor sequence. In addition, when X MHz is 200 MHz, 240 MHz. 280 MHz, or 320 MHz, the PAPR of the PPDU may be further reduced by using the rotation factor sequence provided in this embodiment of this application, so that PAPRs of some fields or all fields of the PPDU are optimal.

In conclusion, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. An information transmission method comprising:
   receiving a physical layer protocol data unit (PPDU) with a bandwidth of 320 MHz, wherein at least a portion of fields in the PPDU are rotated by using a rotation factor sequence comprising 16 rotation factors, wherein the bandwidth of 320 MHz comprises 16 bandwidths of 20 MHz corresponding to the 16 rotation factors, and wherein a first four rotation factors in the rotation factor sequence are [1 -1 -1 -1]; and
   performing a rotation recovery on the at least a portion of fields in the PPDU based on the rotation factor sequence.

2. The method according to claim 1, wherein the PPDU comprises a legacy short training field (L-STF), a legacy long training field (L-LTF), and a legacy signal field (L-SIG), and wherein the L-STF, the L-LTF, and the L-SIG are duplicated in the 16 bandwidths of 20 MHz and are rotated by using the rotation factor sequence.

3. The method according to claim 1, wherein a field in at least one of the 16 bandwidths of 20 MHz is rotated.

4. The method according to claim 1, wherein the rotation factor sequence is one of the following sequences: [1 -1 -1 -1 1 1 j -j 1 -1 1 1 1 1 -jj], [1 -1 -1 -1 1 1 1 -jj 1 -1 1 1 1 1 j -j], [1 -1 -1 -1 1 j 1 j 1 -j 1 1 1 -1 1 1 -j 1 j], [1 -1 -1 -1 1 j 1 j 1 1 1 1 -1 1 -jj 1], [1 -1 -1 -1 1 -j 1 j 1 1 1 1 1 1 j 1 j], [1 -1 -1 -1 1 -jj 1 1 1 1 -1 1 j -j 1], [1 -1 -1 -1 j 1 j -1 -1 1 1 -1 -j 1 -j -1], [1 1 1 -1 j 1 -1 j -1 -1 1 1 -j 1 -j], [1 -1 -1 -1 j j 1 -1 -1 1 -1 -j -j 1 -1], [1 -1 -1 -1 j j 1 1 1 1 -1 -1 -j -j -1 1], [1 -1 -1 -1 j -1 1 j -1 -1 1 1 -j -1 1 -j], [1 -1 -1 -1 j -1 -1 1 1 -1 -j -1 j 1 1 -1 -1 -1 1 1 -1 j -j 1], [1 -1 -1 -1 -j 1 -j 1 -1 1 1 -1 1 -1 -1 j j], [1 -1 -1 -1 -j j 1 1 1 1 -1 1 -j -1 j 1], [1 -1 -1 -1 -j -1 1 1 j 1 -1 -1 -1 -1 -jj -1], [1 -1 -1 -1 -1 -jj 1 -1 1 1 -1 -1 -jj -1], [1 1 -1 -1 -1 -jj -1 1 1 1 1 -1 -1 -j -j -1], [1 -1 -1 -1 -1 -j -1 j 1 1 -1 1 -j 1 -1 -1 j], [1 -1 -j -1 -1 1 1 j 1 -1 j], [1 -1 -1 -1 -j 1 -j -1 -1 1 1 j 1 j -1], [1 -1 -1 -1 -j -1 1 -1 1 j 1 1 j], [1 -1 -1 -1 -j -j 1 -1 -1 1 1 j -1 1 j], [1 -1 -1 -1 -j j 1 -1 -1 1 1 -1 1 j j 1 -1], or [1 -1 -1 -1 -j -j -1 1 -1 1 -1 1 j j -1 1].

5. An communications apparatus, comprising:
   at least one processor; and
   a memory coupled to the at least one processor and storing computer readable instructions for execution by the least one processor to cause the communication apparatus to:
      receive a physical layer protocol data unit (PPDU) with a bandwidth of 320 MHz, wherein at least a portion of fields in the PPDU are rotated by using a rotation factor sequence comprising 16 rotation factors, wherein the bandwidth of 320 MHz comprises 16 bandwidths of 20 MHz corresponding to the 16 rotation factors, and wherein a first four rotation factors in the rotation factor sequence are [1 -1 -1 -1]; and
      perform a rotation recovery on the at least a portion of fields in the PPDU based on the rotation factor sequence.

6. The communications apparatus according to claim 5, wherein the PPDU comprises a legacy short training field (L-STF), a legacy long training field (L-LTF), and a legacy signal field (L-SIG), and wherein the L-STF, the L-LTF, and the L-SIG are duplicated in the 16 bandwidths of 20 MHz and are rotated by using the rotation factor sequence.

7. The communications apparatus according to claim 5, wherein a field in at least one of the 16 bandwidths of 20 MHz is rotated.

8. The communications apparatus according to claim 5, wherein the rotation factor sequence is one of the following sequences: [1 -1 -1 -1 1 1 1 j -j 1 -1 1 1 1 1 1 -jj], [1 -1 -1 -1 1 1 1 -jj 1 -1 1 1 1 1 j -j], [1 -1 -1 -1 1 j 1 -j 1 1 -1 1 1 -j 1 j], [1 -1 -1 -1 1 j -j 1 1 1 1 -1 1 -jj 1], [1 -1 -1 1 1 j 1 j 1 1 -1 1 1 j 1 -j], [1 -1 -1 -1 1 -j j 1 1 1 1 -1 1 -jj], [1 -1 -1 -1 -1 j 1 j -1 -1 -1 1 -j 1 j -1], [1 -1 -1 -1 j 1 -1 -1 1 -1 -1 j -1 -1 -j -1 -1], [1 -1 -1 -1 j j 1 -1 -1 1 -1 -1 -j -j 1 -1], [1 -1 -1 -1 j j 1 1 1 1 -1 1 -1 -j -j -1 1], [1 -1 -1 -1 j -1 1 j 1 1 -1 1 -j -1 -j 1], [1 -1 -1 -1 j -j -1 1 1 1 -1 1 -j j -1 1], [1 -1 -1 -1 -j 1 -1 1 -1 -jj], [1 -1 -1 -1 -1 -jj 1 -1 1 1 1 -1 -jj], [1 -1 -1 -1 -jj 1 1 1 -1 -1 -j -j -1], [1 -1 -1 -1 -j -j 1 1 1 1 -1 1 -j -j 1 1 -1 1 j], [1 -1 -1 -1 -j -1 1 1 -1 1 j 1 -j], [1 -1 -1 -1 -j 1 -j -1 -1 1 1 j -1 j -1], [1 -1 -1 -1 -j -j 1 -1 -1 1 1 j 1 j 1], [1 -1 -1 -1 -j -j -1 1 1 -1 -1 -1 -1 j j 1 1], [1 -1 -1 -1 -j j 1 -1 -1 1 1 -1 1 j j 1 -1], or [1 -1 -1 -1 -j -j -1 1 -1 1 -1 1 j j -1 1].

9. A non-transitory computer readable storage medium storing computer readable instructions executable by at least one processor comprised in an information transmission apparatus to cause the information transmission apparatus to:
   receive a physical layer protocol data unit (PPDU) with a bandwidth of 320 MHz, wherein at least a portion of fields in the PPDU are rotated by using a rotation factor sequence comprising 16 rotation factors, wherein the bandwidth of 320 MHz comprises 16 bandwidths of 20 MHz corresponding to the 16 rotation factors, and wherein a first four rotation factors in the rotation factor sequence are [1 -1 -1 -1]; and
   perform a rotation recovery on the at least a portion of fields in the PPDU based on the rotation factor sequence.

10. The non-transitory computer readable storage medium according to claim 9, wherein the PPDU comprises a legacy short training field (L-STF), a legacy long training field (L-LTF), and a legacy signal field (L-SIG), and wherein the L-STF, the L-LTF, and the L-SIG are duplicated in the 16 bandwidths of 20 MHz and are rotated by using the rotation factor sequence.

11. The non-transitory computer readable storage medium according to claim 9, wherein a field in at least one of the 16 bandwidths of 20 MHz is rotated.

12. The non-transitory computer readable storage medium according to claim 9, wherein the rotation factor sequence is one of the following sequences: [1 -1 -1 -1 1 1 j -j 1 -1 1 1 1 1 -j j], [1 -1 -1 -1 1 1 -j j 1 -1 1 1 1 1 j -j], [1 -1 -1 -1 1 j 1 -j 1 1 -1 1 1 -j 1 j], [1 -1 -1 -1 1 j -j 1 1 1 1 -1 1 -j j 1], [1 -1 -1 -1 1 -j 1 j 1 1 -1 1 1 1 j 1 -j], [1 -1 -1 -1 1 -j j 1 1 1 1 -1 1 j -j 1], [1 -1 -1 1 j 1 j 1 -1 -1 1 -1 -j 1 -j -1], [1 -1 -1 -1 j 1 -1 j -1 -1 -1 1 -j 1 -1 -j], [1 -1 -1 -1 j j 1 -1 -1 1 -1 -1 -j -j 1 -1], [1 -1 -1 -1 j j -1 1 -1 1 -1 -1 -j -j 1 1], [1 -1 -1 -1 j -1 1 j -1 -1 -1 1 -j 1 1 j], [1 -1 -1 -1 j -1 j 1 -1 -1 1 -1 -j 1 -j -1], [1 -1 -1 -1 -j 1 -j 1 1 -1 1 -1 -j -1 j 1], [1 -1 -1 -1 -j 1 -j -1 1 1 1 -1 -1 -j j -1], [1 -1 -1 -1 -j -1 -j j 1 -1 1 -1 -1 -jj -1], [1 -1 -1 -1 -1 -1 j -j 1 -1 1 1 -1 -1 j -j], [1 -1 -1 -1 -1 -1 -j j 1 -1 1 1 -1 -1 j -j], [1 -1 -1 -1 -1 -j j 1 1 1 -1 -1 -1 j -j], [1 -1 -1 -1 -1 -j -1 j 1 1 -1 1 -1 j -1 -j], [1 -1 -1 -1 -j 1 -1 -j -1 -1 -1 1 j 1 -1 j], [1 -1 -1 -1 -j 1 -j -1 -1 1 1 -1 j 1 j -1], [1 -1 -1 -1 -j -1 1 j -1 -1 -1 1 1 j -1 -1 j], [1 -1 -1 -1 -j -1 -j 1 -1 -1 1 1 -1 -j 1 j 1], [1 -1 -1 -1 j j 1 1 -1 -1 1 -1 -1 -j j 1 -1], or [1 -1 -1 -1 -j -j -1 1 -1 1 -1 -1 j j -1 1].

* * * * *

UNITED STATES PATENT AND TRADEMARK OFFICE
CERTIFICATE OF CORRECTION

PATENT NO. : 11,792,060 B2
APPLICATION NO. : 17/990416
DATED : October 17, 2023
INVENTOR(S) : Ming Gan, Xin Zuo and Xun Yang It is certified that error appears in the above-identified patent and that said Letters Patent is hereby corrected as shown below:

On the Title Page

Column 2 item (57) (Abstract), Line 8, please delete "ofY" and insert therefore -- of Y --;

In the Claims

Column 21, Line 43-44, Claim 4, please delete "[1 -1 -1 -1 1 j 1 j 1 -j 1 1 1 -1 1 1 -j 1 j]," and insert therefore -- [1 -1 -1 -1 1 j 1 -j 1 1 -1 1 1 -j 1 j], --;

Column 21, Line 44-45, Claim 4, please delete "[1 -1 -1 -1 1 -j 1 j 1 1 1 1 1 j 1j]," and insert therefore -- [1 -1 -1 -1 1 -j 1 j 1 1 -1 1 1 j 1 -j], --;

Column 21, Line 46-47, Claim 4, please delete "[1 11 -1 j 1 -1 j -1 -1 - 1 1 -j 1 -1 -j]," and insert therefore -- [1 - 1 -1 -1 j 1 -1 j -1 -1 -1 1 -j 1 -1-j], --;

Column 21, Line 47-48, Claim 4, please delete "[1 -1 -1 -1 j j 1 11 1 -1 -1 -j -j -1 1]," and insert therefore -- [1 -1 -1 -1 j j -11 -1 1 -1 -1 -j -j -1 1], --;

Column 21, Line 48-49, Claim 4, please delete "[1 -1 -1 -1 j -1 j 1 -1 -1 1 1j -1 -j 1]," and insert therefore -- [1 -1 -1 -1 j -1 j 1 -1 -1 1 -1 -j -1 -j 1], --;

Column 21, Line 51-52, Claim 4, please delete "[1 -1 -1 11 -jj -1 1 1 1 -1 -1 j -j-1]," and insert therefore -- [1 -1 -1 -1 -1 -jj -1 1 1 1 -1 -1 j -j -1], --;

Column 22, Line 25, Claim 8, please delete "[1 -1 -1 1 1j 1 j 1 1 -1 1 1 j 1 -j]," and insert therefore -- [1 -1 -1 -1 1 -j 1 j 1 1 -1 1 1 j 1 -j], --;

Column 22, Line 26, Claim 8, please delete "[1 -1 -1 -1 j 1 j -1 -1 -1 1 -1 j 1j -1]," and insert therefore -- [1 -1 -1 -1 j 1 j -1 -1 -1 1 -1 -j 1 -j -1], --;

Signed and Sealed this
Seventh Day of May, 2024

Katherine Kelly Vidal
*Director of the United States Patent and Trademark Office*

CERTIFICATE OF CORRECTION (continued)
U.S. Pat. No. 11,792,060 B2

Column 22, Line 29, Claim 8, please delete "[1 -1 -1 -1 j 1 j 11 -1 1 -1 -j-1 -j 1]," and insert therefore -- [1 -1 -1 -1 j -1 j 1 -1 -1 1 -1 -j -1 -j 1], --;

Column 22, Line 31, Claim 8, please delete "[1 -1 -1 -1 -1 -1 -j j 1 -1 1 1 -1 -1 j j]," and insert -- [1 -1 -1 -1 -1 -1 -jj 1 -1 1 1 -1 -1 j -j], --;

Column 22, Line 32, Claim 8, please delete "[11 -1 -1 -1 -j j -1 1 1 1 -1 -1 j -j -1]," and insert -- [1 -1 -1 -1 -1 -jj -1 1 1 1 -1 -1 j -j-1], --;

Column 22, Line 33, Claim 8, please delete "[1 -1 -1 1j 1 -1 -j -1 -1 -1 1 j 1 -1 j]," and insert therefore -- [1 -1 -1 -1 -j 1 -1 -j -1 -1 -1 1 j 1 -1 j], --;

Column 23, Line 3-4, Claim 12, please delete "[1 -1 -1 1 j 1 j1 -1 -1 1 -1 -j 1 -j -1]," and insert therefore -- [1 -1 -1 -1 j 1 j -1 -1 -1 1 -1 -j 1 -j -1], --;

Column 23, Line 6, Claim 12, please delete "[1 -1 -1 -1 j -1 1 j -1 -1 -1 1 -j 1 1j]," and insert therefore -- [1 -1 -1 -1 j -1 1 j -1 -1 -1 1 -j -1 1 -j], --;

Column 23, Line 13, Claim 12, please delete "[1-1-1-1 jj 1 -1 -1 1 -1 -1 j j 1 -1]," and insert therefore -- [1 -1 -1 - 1 -j -j 1 -1 -1 1 -1 -1 j j 1 -1], --.